United States Patent
Ohr et al.

(10) Patent No.: US 7,680,830 B1
(45) Date of Patent: Mar. 16, 2010

(54) SYSTEM AND METHOD FOR POLICY-BASED DATA LIFECYCLE MANAGEMENT

(75) Inventors: James Philip Ohr, St. Paul, MN (US); Christopher James Elphinstone Chandler, Boston, MA (US); Guy Barry Owen Bunker, Buckinghamshire (GB)

(73) Assignee: Symantec Operating Corporation, Mountain View, CA (US)

( * ) Notice: Subject to any disclaimer, the term of this patent is extended or adjusted under 35 U.S.C. 154(b) by 493 days.

(21) Appl. No.: 11/144,116

(22) Filed: May 31, 2005

(51) Int. Cl.
G06F 12/00 (2006.01)
G06F 17/30 (2006.01)

(52) U.S. Cl. .................. 707/200; 707/203; 707/204

(58) Field of Classification Search .......... 707/200–206
See application file for complete search history.

(56) References Cited

U.S. PATENT DOCUMENTS

| | | | |
|---|---|---|---|
| 6,266,784 B1 * | 7/2001 | Hsiao et al. ................ | 714/6 |
| 6,718,372 B1 * | 4/2004 | Bober ........................ | 709/217 |
| 7,143,091 B2 | 11/2006 | Charnock et al. | |
| 7,149,738 B2 | 12/2006 | Kumar et al. | |
| 7,155,466 B2 * | 12/2006 | Rodriguez et al. .......... | 707/205 |
| 7,246,104 B2 * | 7/2007 | Stickler .................... | 707/1 |
| 7,318,072 B2 * | 1/2008 | Margolus et al. ........... | 707/200 |
| 7,496,555 B2 * | 2/2009 | Margolus .................... | 707/1 |
| 2002/0174180 A1 * | 11/2002 | Brown et al. ............... | 709/203 |
| 2003/0088573 A1 * | 5/2003 | Stickler .................... | 707/100 |
| 2003/0154293 A1 * | 8/2003 | Zmolek ...................... | 709/228 |
| 2003/0225801 A1 * | 12/2003 | Devarakonda et al. ....... | 707/205 |
| 2004/0002942 A1 * | 1/2004 | Pudipeddi et al. .......... | 707/1 |
| 2004/0168057 A1 * | 8/2004 | Margolus et al. .......... | 713/158 |
| 2004/0177228 A1 * | 9/2004 | Leonhardt et al. ......... | 711/170 |
| 2004/0205112 A1 * | 10/2004 | Margolus ................... | 709/201 |
| 2004/0225611 A1 * | 11/2004 | Stefik et al. .............. | 705/52 |
| 2005/0065961 A1 * | 3/2005 | Aguren ..................... | 707/102 |
| 2005/0086172 A1 * | 4/2005 | Stefik ...................... | 705/51 |
| 2005/0097260 A1 * | 5/2005 | McGovern et al. .......... | 711/100 |

(Continued)

OTHER PUBLICATIONS

SearchStorage.com, Definitions—data life cycle management, Nov. 20, 2004, 5 pages. http://searchstorage.techtarget.com/sDefinition/0,,sid5_gci963642,00.html.

(Continued)

*Primary Examiner*—Jean M Corrielus
*Assistant Examiner*—Angelica Ruiz
(74) *Attorney, Agent, or Firm*—Robert C. Kowert; Meyertons, Hood, Kivlin, Kowert & Goetzel, P.C.

(57) ABSTRACT

System and method for policy-based lifecycle management of data in file systems. In embodiments, an expiration policy for the files may be stored as part of the file system metadata. The expiration policy may be as simple as an expiration date for the file, or a more complex policy that specifies one or more metrics to be evaluated to determine if a file is expired. The expiration policy may also specify one or more actions to be taken if the file has expired. The expiration policy may be evaluated on attempts to access the files in the file system, on other file systems, and on backup/archive images to determine if the files are expired and thus whether access to the files is to be allowed. In one embodiment, a scan mechanism may periodically or aperiodically delete files in the file system for which the expiration date has passed.

29 Claims, 15 Drawing Sheets

U.S. PATENT DOCUMENTS

| | | | |
|---|---|---|---|
| 2005/0120025 A1* | 6/2005 | Rodriguez et al. | 707/10 |
| 2005/0171979 A1* | 8/2005 | Stager et al. | 707/200 |
| 2005/0195660 A1* | 9/2005 | Kavuri et al. | 365/189.05 |
| 2005/0226059 A1* | 10/2005 | Kavuri et al. | 365/189.05 |
| 2005/0235072 A1* | 10/2005 | Smith et al. | 710/22 |
| 2006/0004819 A1* | 1/2006 | Claudatos et al. | 707/101 |
| 2006/0004868 A1* | 1/2006 | Claudatos et al. | 707/104.1 |
| 2006/0010150 A1* | 1/2006 | Shaath et al. | 707/102 |
| 2006/0010301 A1* | 1/2006 | Yagawa | 711/163 |
| 2006/0053261 A1* | 3/2006 | Prahlad et al. | 711/162 |
| 2006/0053263 A1* | 3/2006 | Prahlad et al. | 711/162 |
| 2006/0069662 A1* | 3/2006 | Laborczfalvi et al. | 707/1 |
| 2006/0101084 A1* | 5/2006 | Kishi et al. | 707/200 |
| 2006/0106884 A1* | 5/2006 | Blumenau et al. | 707/200 |
| 2006/0161590 A1* | 7/2006 | Cahill et al. | 707/200 |
| 2007/0130127 A1* | 6/2007 | Passmore et al. | 707/3 |

OTHER PUBLICATIONS

VERITAS, VERITAS Architecture Network, "Understanding Data Lifecycle Management," Nov. 24, 2003, 8pgs. http://www.veritas.com/van/articles/4435.jsp.

VERITAS, "Data Lifecycle Manager: Software for Enabling Automated Management of Data from Creation to Disposal," Jeff Lundberg—May 14, 2004, 15 pages. http://www.veritas.com/van/articles/6447.jsp.

* cited by examiner

SYSTEM AND METHOD FOR POLICY-BASED DATA LIFECYCLE MANAGEMENT

BACKGROUND OF THE INVENTION

1. Field of the Invention

This invention is related to the field of computer systems and, more particularly, to data lifecycle management in data storage systems.

2. Description of the Related Art

One requirement of data lifecycle management in file systems is to ensure that all copies of a lifecycle-managed object are deleted in a timely manner. While placing managed files into a repository (e.g., EMC Centera, KVS vault, etc) may ensure that the files in the repository can be deleted as desired, it may be difficult to manage files and copies of files that are in a network of file systems across arbitrary machines, and their archives and backup images. For example, if a copy of a lifecycle-managed document is made, moved to a local directory, and then renamed, how can a compliance officer be sure the copy is destroyed in conjunction with the original? In some environments, it may be just as important that all pertinent copies be destroyed in a timely manner as it is that the documents be maintained for the specified period.

Regulatory compliance is a major concern of for-profit entities such as corporations, and also for non-profit entities. For example, the financial industry, public companies, and even non-profit organizations are subjected to increasing amounts of scrutiny about how they perform financial transactions. As part of this scrutiny, various entities may be required to conform to regulations regarding data retention, both for paper data and electronic data. For example, entities may be required to keep certain data, and perhaps even all copies of the data, for a specified period, for example five years, but perhaps even for decades in the case of some data. Note that these regulations may be changed by the regulatory organization to either require shorter or longer retention periods for data. Note that even entities not under such regulatory control may establish rules and guidelines for retaining at least some of their data for a specified period. Generally, entities establish rules and guidelines to delete much if not all of their documents, both electronic and paper, after the retention period, whether internally or externally imposed, for the documents has expired.

A problem facing those responsible for compliance with internal or external data retention regulations is with the ability to delete all copies of documents that are no longer required to be kept. For example, the electronic documents of an entity may need to be retained for a period for legal reasons, but the organization may wish to delete them after that time has elapsed. Conventionally, it is difficult if not impossible to completely delete these electronic documents and all copies of the documents. For one thing, an original electronic document that has been retained and is now expired may have been copied, renamed, modified, backed up to multiple backup images, copied to other systems including laptops and employee's home computers, and so on, thus making all the copies difficult if not impossible to locate. Even if an IT department were able to identify where all the copies of the document are located, it is unlikely that the IT department would be able to delete all the copies, because the copies may be located on many people's personal discs, in backup images that are in a vault offsite, and so on.

File Systems

A file system may be defined as a collection of files and file system metadata (e.g., directories and inodes) that, when set into a logical hierarchy, make up an organized, structured set of information. File systems organize and manage information stored in a computer system. File systems may support the organization of user data by providing and tracking organizational structures such as files, folders, and directories. A file system may interpret and access information stored in a variety of storage media, abstracting complexities associated with the tasks of locating, retrieving, and writing data to the storage media. File systems may be mounted from a local system or remote system. File system software may include the system or application-level software that may be used to create, manage, and access file systems.

File system metadata may be defined as information that file system software maintains on files stored in the file system. File system metadata may include, but is not limited to, definitions and descriptions of the data it references. File system metadata may include one or more of, but is not limited to, inodes, directories, mapping information in the form of indirect blocks, superblocks, extended attributes of files or the equivalent thereof, etc. In some cases, file system metadata for a file includes path information for the file as seen from the application side and corresponding file system location information (e.g. device:block number(s)). File system metadata may itself be stored on a logical or physical device within a file system.

SUMMARY

Embodiments of a system and method for policy-based lifecycle management of data in file systems are described. In embodiments, a data lifecycle management mechanism for the policy-based lifecycle management of files may ensure that lifecycle-managed files are deleted or otherwise properly handled on or after their respective expiration dates. In embodiments, a file expiration date for a file may be made an immutable attribute of the file system metadata maintained for files in the file system by the file system software, and the File System software, or alternatively another mechanism such as a driver at the file system level, may be responsible for the deletion of the files, or other disposition according to the expiration policies for the files, on or after the specified expiration dates.

In some embodiments, the extended attribute store, or alternatively other file system metadata, of a file may be used to define a policy for expiring the file. In these embodiments, rather than having just an expiration date as an immutable attribute of the file system metadata maintained for files in the file system, an expiration policy for the files may be stored as part of the file system metadata, for example in the extended attributes of the files in file systems that support extended attributes. The expiration policy may be as simple as an expiration date for the file, or a more complex policy that specifies one or more metrics to be evaluated to determine if a file is to be expired. In one embodiment, the expiration policy definition may also specify one or more actions to be taken if the file has expired. Some embodiments may apply one or more security measures to protect the expiration policy definitions in the file system metadata from unauthorized access.

In one embodiment, the functionalities of the data lifecycle management mechanism may be integrated into a File System's software. In one embodiment, a filter driver may be configured to intercept calls from applications to File System software that attempt to access the files in the file system, and evaluate the expiration policies for the target files to determine if the access are to be allowed or denied according to the expiration dates of the files. Any file existing in, created in, or copied to a file system may be a candidate for policy-based control by the data lifecycle management mechanism. Embodiments may help ensure that copies or derivatives of files that are intentionally or unintentionally created outside the file system are controlled, as well as files within the file system.

In some embodiments, an application or utility that periodically or aperiodically scans the files in the file system may be leveraged to store copies of the expiration policies for the files in a catalog or database. This application or utility may be referred to herein as a scan mechanism. Exemplary scan mechanisms that may be used in various embodiments may include, but are not limited to, one or more of backup systems (which may include a restore mechanism), archiving systems such as Hierarchical Storage Management (HSM) systems, Storage Resource Management (SRM) systems, Virus Scanning systems (i.e., anti-virus mechanisms), and in general any mechanism or system that scans file systems, and that maintains or may be modified to maintain information on files found in the file system in a catalog, database, etc. In some embodiments, two or more such scan mechanisms may be leveraged to store copies of the expiration policies for the files in a catalog or database. Note that, in one embodiment, rather than leveraging an existing scan mechanism, a dedicated mechanism that scans file systems and stores information on files found, including expiration policies, for the purposes of policy-based data lifecycle management as described herein may be implemented.

As noted, in one embodiment, a backup system may be configured to store copies of the expiration policies for files in backup catalogs when backup images are generated. In one embodiment, the backup system may also be configured to store the expiration policy definition for the files in the backup images with the files when the files are backed up. The copies of the expiration policies thus stored in a catalog and/or the backup image may be accessed by the data lifecycle management mechanism to, for example, recover the expiration policies for files for which the expiration policies have been lost, for example by copying to a file system that does not support the metadata format (e.g., extended attributes) used to store the expiration policies, or by copying the files using a copy mechanism, such as FTP or some email systems, that do not support the metadata format (e.g., extended attributes). An exemplary application of expiration policies stored in a catalog (e.g., a backup catalog) is to support the modification of the expiration policies for files after the files have been backed up or archived, and possibly deleted from the file system itself. It may not be possible to update the expiration policies stored in the archive/backup image. Instead, the expiration policies stored in the catalog are updated. On an attempt to restore a file from an archive/backup image, the correct expiration policy for the file may be recovered and applied from the catalog, as the expiration policy stored with the file on the archive/backup image may be out of date.

Some embodiments may provide a mechanism for recovering the expiration policy for a copy of a file for which the associated expiration policy of the original file has been lost, for example by being copied to a file system that does not support extended attributes. In one embodiment, a mechanism may be provided that determines if the file in question is a copy of a particular file on the file system and, if so, assigns the expiration policy for the file on the file system to the file in question. In one embodiment, one or more inference techniques may be used to determine a confidence level that a file in question is a copy of an existing file on the file system and, if the confidence level is over a threshold, may assume that the file in question is indeed a copy of the original file.

BRIEF DESCRIPTION OF THE DRAWINGS

The following detailed description makes reference to the accompanying drawings, which are now briefly described.

Figure 1:
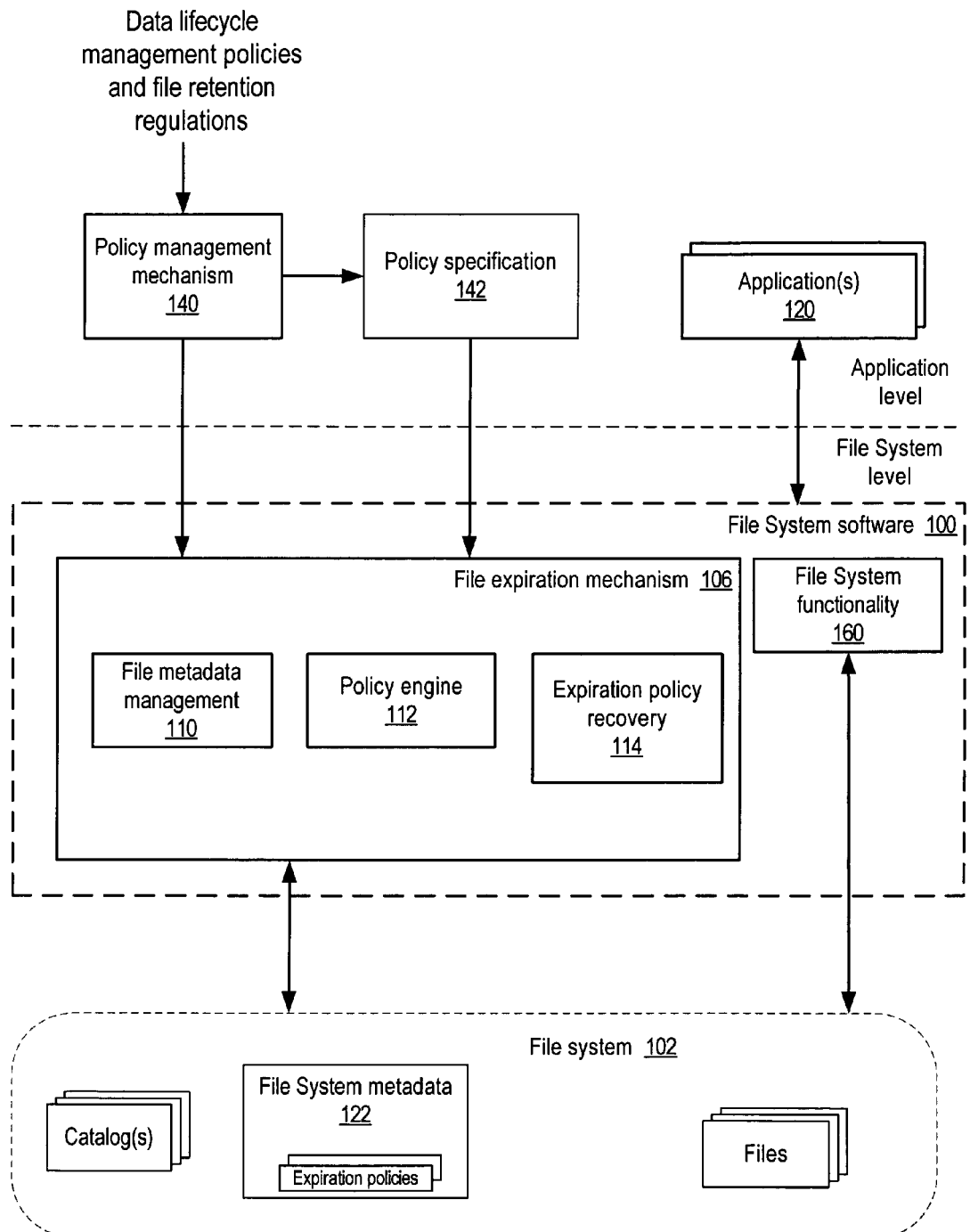
FIG. 1 illustrates an exemplary implementation of a data lifecycle management mechanism in a file system and including a file expiration mechanism implemented at the file system level according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for the policy-based lifecycle management of data in file systems are described. Part of the process of lifecycle management of data is ensuring that all copies of expired data (files) are deleted. Embodiments may provide a policy-based automatic mechanism for the deletion of expired documents (files) in a file system. In embodiments, a mechanism for the policy-based lifecycle management of files in a file system (referred to herein as a data lifecycle management mechanism) may ensure that lifecycle-managed files are deleted or otherwise properly handled on or after their respective expiration dates. In embodiments, a file expiration date that corresponds to the expiration date for the file may be made an immutable attribute of the file system metadata maintained for files in the file system by the file system software, and the file system software itself, or alternatively another mechanism such as a driver at the file system level and not the application software level, may be responsible for the deletion of the files or other disposition according to the expiration policies for the files, on or after the specified expiration dates.

In some embodiments, the extended attribute store (or other type of file system metadata) of a file may be used to define a policy for expiring the file. In these embodiments, rather than having just an expiration date as an immutable attribute of the file system metadata maintained for files in the file system, an expiration policy for the files may be stored as part of the file system metadata, for example in the extended attributes of the files in file systems that support extended attributes. The expiration policy may be as simple as an expiration (or deletion) date for the file, or a more complex policy that specifies one or more metrics to be evaluated to determine if a file is to be expired. In one embodiment, the expiration policy definition may also specify one or more actions, or a combination or series of actions, to be taken if the file has expired. This action may be, for example, the immediate deletion of the file, not deleting the file and returning EACCES (UNIX/LINUX) ERROR_ACCESS_DENIED (Windows), or a similar error message on other operating systems so that the file still exist in the file system but is inaccessible by clients, or some other action or actions. Some embodiments may use security technology to protect the expiration policy definitions in the file system metadata (e.g., in the extended attributes of the files) from being accessed or modified by unauthorized identities (people and/or systems.)

Any file existing in, created in, or copied to a file system may be a candidate for policy-based control by the data lifecycle management mechanism. Embodiments may help ensure that copies or derivatives of files that are intentionally or unintentionally created outside the file system are controlled, as well as files within the file system.

In embodiments of the data lifecycle management mechanism, the expiration policy and the file may be stored together on the file system. This may help to insure that an expiration policy is available with its file, which may help in preventing the expiration policy from being circumvented, and may also provide better performance when opening the file. Note that an IT organization may mandate particular software on corporate personal computers, laptops, and other systems, and thus as part of its data lifecycle management policy may require one or more components of the data lifecycle management mechanism described herein, such as a filter driver to test the expiration policies for files, be installed on systems that may access a corporate file system that implements an embodiment of the data lifecycle management mechanism.

As mentioned, the expiration policies associated with files in a file system may be as simple as expirations dates for the files, or may be more complex. In this document and in the accompanying Figures, the term "expiration policy" may be used to refer both to embodiments or implementations using an expiration date for files stored in the file system metadata, and to embodiments or implementations using more complex expiration policies for files stored in the file system metadata.

In embodiments, various components, functionalities, and/or mechanisms of the data lifecycle management mechanism may be implemented at the file system level rather than at the application (or client) level at which client applications and other software that accesses the file system reside. The file system level may include file system functionality software and various other applications, utilities, systems, drivers and other software (and, in some cases, hardware) that may be used in managing a file system and in controlling access to files stored in the file system from client applications and other software. In this description and in the accompanying Figures, at least some of the functionalities of the data lifecycle management mechanism that may be implemented within the file system software may be collectively referred to as a file expiration mechanism.

Note that, in some embodiments, some functionalities of the data lifecycle management mechanism may be implemented in other software that may conceptually not be part of the file expiration mechanism in file system software, such as a policy management application or utility that provides a user interface for specifying and modifying expiration policies for files in the file system, and for specifying and modifying other policies used by the data lifecycle management mechanism. Other examples include, but are not limited to, a backup system, HSM system, SRM system, anti-virus mechanism, filter driver, etc. Conceptually, however, this software may all be considered to be operating at the file system level (as opposed to the application level at which client applications and other software that accesses the file system reside), although the particular software may or may not be a part of the file system software as described herein, though at least some, such as the policy management application or utility, may be considered to be operating at least in part at the application level.

FIG. 1 illustrates an exemplary implementation of a data lifecycle management mechanism for a file system that includes a file expiration mechanism implemented at the file system level according to one embodiment. Note that, in one embodiment, the file expiration mechanism 106 may include all of the functionality and mechanisms of the data lifecycle management mechanism described herein. In other embodiments, one or more of the functionalities or mechanisms of the data lifecycle management mechanism, such as a policy management mechanism 140 described below, may be implemented as a separate component or components, at least part of which may be implemented at the application level rather than at the file system level. Also note that, in one embodiment, the file expiration mechanism 106 may be implemented as an integrated part of File System software. In another embodiment, at least a part of the file expiration mechanism may be implemented at the file system level, but as separate components not integrated directly in the File System software.

Policy-based systems generally include, as a minimum, a mechanism to evaluate the policies and perform any actions or tasks determined from the evaluation. This policy evaluation mechanism may be referred to as a decision engine or policy engine. In embodiments of the data lifecycle management mechanism, the policy engine 112 functionality may be implemented at the file system level. In one embodiment, the policy engine 112 functionality may be built into the File System functionality 160 of the file system software itself. In other embodiments, at least part of the policy engine 112 functionality may be implemented at the file system level, but separate from the File System functionality 160. Note that at least part of the policy engine 112 functionality may also be implemented in applications, utilities, components, plug-in modules, drivers, or elsewhere at the file system level in various embodiments.

Policy-based systems typically also include a mechanism to specify, modify, and manage the policies, which may be referred to as a policy management mechanism. At least some embodiments of the data lifecycle management mechanism may provide an application, utility, module, tool, or other mechanism as a policy management mechanism 140 for managing and facilitating the implementation of the data lifecycle management policies and file retention regulations. In embodiments, the policy management mechanism 140 may provide a user interface that may be configured for use in defining and managing the implementation of the internally- and/or externally-imposed retention regulations for data within the file system 102. Functions that may be performed using the policy management mechanism 140 may include, but are not limited to, specifying the retention periods for all files or for groups of files in the file system 102 or for particular types of files, files with particular owners or creators, files created by particular applications, files in particular directories, and so on. The functions that may be performed using the policy management mechanism 140 may also include, for example, specifying what action or actions are to be performed for all files, groups of files, or particular files, types of files, etc. when the files expire. In other words, the policy management mechanism 140 may be used to define the expiration policies for all files, for selected files, or for types or groups of files in the file system, and may be used to specify different expiration policies for different types of files, files with different owners or creators, etc. Note that, in one embodiment, the policy management mechanism 140 may also be used to change, modify, and/or delete the expiration policies for particular files, for particular types of files, for all files in the file system 102, etc.

In some embodiments of the data lifecycle management mechanism, the policy management mechanism 140 may be implemented at the file system level. In some embodiments, the policy management mechanism may be implemented at the application level, as illustrated in FIG. 1. Also note that, in some embodiments, part of the policy management functionality may be implemented at the file system level, and part at the application level. Note that, while the policy management mechanism 140 may be implemented as an application at the application level, conceptually it may still be considered part of the file system software.

The above describes the policy engine 112 and policy management mechanism 140 as components or functionality of at least some embodiments of the data lifecycle management mechanism. Another aspect, component or functionality of at least some embodiments of the data lifecycle management mechanism is a mechanism or functionality for adding, removing, and/or modifying the expiration policies, which may be specified by the policy management mechanism 140, into file system metadata 122 for files in a file system 102. This mechanism or functionality may be referred to as a file metadata management mechanism. The file metadata management mechanism 110 may, for example, include functionality for calculating an actual expiration (or deletion) date for files based on the retention period(s) for the files, which may be specified by the policy management mechanism 140. Also note that the file metadata management mechanism 110 may also include one or more of, but is not limited to, functionality for adding expiration policies to the metadata 122 for newly-created files in the file system 102, functionality for adding expiration policies to the metadata 122 for existing files within the file system 102, functionality for adding expiration policies to the metadata 122 for files copied to file system 102, functionality for modifying and/or deleting expiration policies for files, and other functionalities for managing the expiration policies in file system metadata 122.

In one embodiment, the policy management mechanism 140 may be configured to generate a policy specification 142 for the file system 102 that the file metadata management mechanism 110 may access to determine expiration policies for particular files, types of files, etc, for example when the files are created. Also note that embodiments may provide an API to the file metadata management mechanism 110 that allows the policy management mechanism 140, and possibly other mechanisms or applications, to access at least part of the file metadata management 110 functionality to modify, remove, and/or add expiration policies for particular files, types of files, groups of files, all files, etc., in the file system 102. Note that, in embodiments, one or more security measures may be implemented to protect this API, and thus the expiration policies for files within the file system 102, from intentional or unintentional abuse.

In embodiments, the file metadata management 110 functionality may be implemented at the file system level. In one embodiment, the file metadata management 110 functionality may be integrated in the File System functionality 160 software itself In other embodiments, the file metadata management 110 functionality may be implemented at the file system level, but separate from the File System functionality 160 software (i.e. not directly integrated into the File System software). For example, in some embodiments, at least part of the file metadata management 110 functionality may be implemented in one or more filter drivers that conceptually reside at the file system level and that may intercept file creation, copy, and/or other related calls from applications to the File System functionality 160 software.

Yet another aspect, component or functionality of embodiments of the data lifecycle management mechanism is a mechanism or functionality for handling files that are intentionally or unintentionally moved or copied within the file system 102, moved or copied from the file system 102 to other file systems, or that are backed up to backup images by a backup system or to other types of archives, for example using a Hierarchical Storage Management (HSM) system or other such archiving system, and for handling cases where files that have been copied are copied back to or restored to the file system 102 either before or after their expiration dates, and for recovering, if necessary, the expiration policy information for such files. This functionality may be referred to herein as an expiration policy recovery mechanism. To recover expiration policy information for files, the expiration policy recovery mechanism 114 may implement a method for determining the expiration policy for files from information determined from the files themselves and/or from information about the file in a database or catalog such as a backup or other archive catalog, or from a copy of the expiration policy that was stored with the file in a backup or other archive image. In some embodiments, this functionality may be included in or integrated with the file metadata management mechanism 110. In other embodiments, at least part of the expiration policy recovery 114 functionality may be implemented as a separate mechanism or component of the data lifecycle management mechanism. In some embodiments, at least part of the expiration policy recovery 114 functionality may be integrated in File System functionality 160 software.

Note that, in some embodiments, the various functionalities and mechanisms described above may be implemented as separate components or modules of the data lifecycle management mechanism. In other embodiments, one or more of the functionalities and mechanisms may be combined in components or modules. For example, in one embodiment, the file metadata management 110 functionality and the policy engine 112 may be implemented as a single module or component. Also note that, in embodiments, some or all of the functionality described above may be integrated into File System software as part of File System functionality 160. In one embodiment, a File System may include all of the functionality described above integrated as a component or components of the File System functionality 160.

Note that it is possible to implement at least part of the data lifecycle management mechanism as described herein in hardware and/or in a combination of hardware and software.

Figure 2:
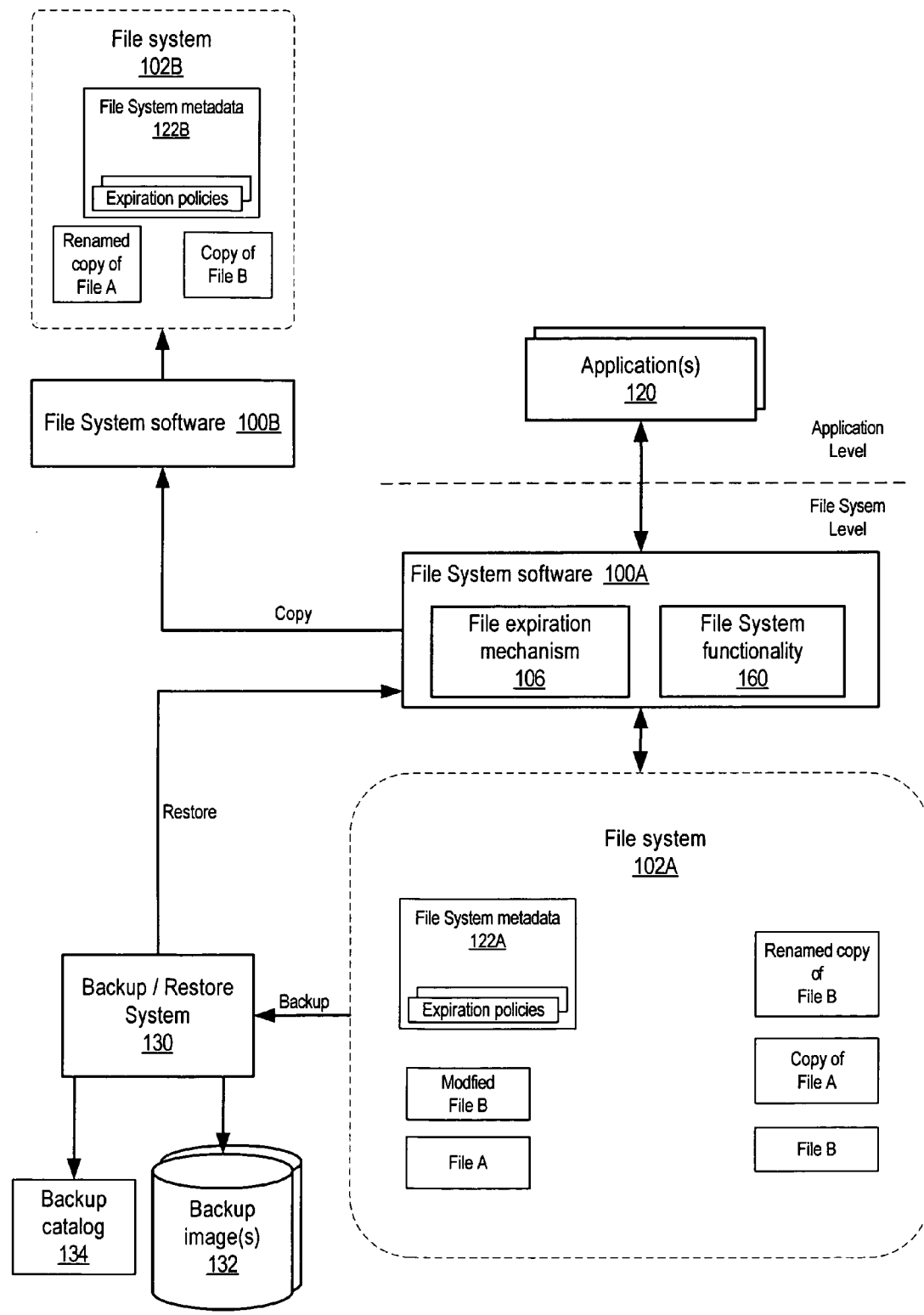
FIG. 2 illustrates an exemplary file system implementation of a data lifecycle management mechanism according to one embodiment.

FIG. 2 illustrates an exemplary file system implementation of a data lifecycle management mechanism according to one embodiment. File system software 100A may be implemented on one or more of any of various types of devices, including, but not limited to, a personal computer system, desktop computer, laptop or notebook computer, mainframe computer system, workstation, server, network computer, or other suitable device. File system 102A may be implemented on one or more physical storage devices or, alternatively, may be implemented as volumes or virtual devices allocated across one or more physical storage devices. The storage devices used to implement the file system 102A may include any of one or more types of storage devices, or combinations thereof, including, but not limited to, CD-ROM or floppy disk, computer system memory such as DRAM, SRAM, EDO RAM, SDRAM, DDR SDRAM, Rambus RAM, etc., non-volatile memory such as a magnetic media, e.g., hard drives and optical storage devices, storage systems such as RAID (Redundant Array of Independent Disks) systems, disk arrays, JBODs (Just a Bunch Of Disks, used to refer to disk cabinets that do not have a built-in RAID controller), etc. The storage devices used to implement file system 102A may include other types of storage devices as well, or combinations thereof. File system 102A may be accessible from two or more systems, devices, and/or applications via a wired and/or wireless network such as a LAN, WAN, or even the Internet, or may be a local file system dedicated to one system, device, or application. File system 102A may be implemented according to various file system architectures including, but not limited to: Storage Area Network (SAN), Network-Accessible Storage (NAS), and multi-volume file system or hierarchical file system (HSM).

File system software 100A may include the system or application-level software that may be used to create, manage, and access the file system 102A. In embodiments, an expiration policy may be added by the file system software 100A as an attribute of file system metadata 122A that is maintained in file system 102A. In one embodiment, the File System functionality 160 of the file system software 100A may add expiration policies to files when the files are created, and insure that the original expiration policies are copied with copies or derivatives of the original files. In another embodiment, a filter driver (not shown) at the file system level but separate from the File System functionality software itself may be used to add expiration policies to files by intercepting file creation calls from applications 120 to the file system software 100A. Other embodiments may use other mechanisms to add expiration policies to files.

The expiration policy may be an immutable attribute of the files that is maintained by the file system software 100A and associated with the original files and any copies or derivatives of the files. A file expiration mechanism 106 at the file system level may be responsible for the regular grooming of the file system 102A and the deletion of any files for which the expiration date had been reached or exceeded. Note that, in various embodiments, the expiration date may be stored in the expiration policy in various formats and/or representations, typically but not necessarily according to a date format and/or representation used by the file system. The date format "MM/DD/YYYY" may be used as an exemplary representation for dates herein. For example, a file created on Dec. 1, 2005, under a compliance regulation that specifies files must be kept for five years (the retention period), may have a creation date of 12/01/2005 and an expiration date of 12/01/2010 (or, alternatively, 12/02/2010), both of which may be stored in the file system metadata 122A and associated with the file. If the file is copied within the file system, the expiration policy of the original file is stored in the file system metadata 122A associated with the new copy of the file by the file system software 100A. Note that, depending on the file system, the copy of the file may or may not have the same creation date as the original file.

Note that different files in the file system 102A may have different retention periods, depending on the internally- or externally-imposed retention requirements of the entity that owns the file system. How long to keep a file (the retention period), whether to delete particular files or keep particular files indefinitely, and other questions on data retention and regulation compliance may be based on a variety of factors including one or more of, but not limited to: the file type, the file extension, the creator and/or owner of the file (whether a specific user or employee, position (e.g., CEO or CFO), department, division, etc., or combination thereof), the application that creates the file, the directory or folder the file is created in, the system or network address the file was created from, the name of the file, etc.

In some embodiments, alternatives to an expiration date may be used, such as a representation of the number of days, months or years that the file is to be retained (the retention period). It is to be understood that anywhere in this document that an expiration date is referred to, any suitable alternative (such as a retention period) may be substituted. Using the above example, the file may have a creation date of 12/01/2005 and, instead of an expiration date, a retention period (in months) of 60. The file system software 100A may then determine the expiration date of the file from the creation date and the retention period stored in the file system metadata 122A. Note again that different files in the file system 102A may have different retention periods. Since, in at least some file systems, a copy of a file may not have the same creation date as the original file, in some embodiments using a retention period instead of a retention date, a copy of a file may be given an adjusted retention period so that the copy expires at or about the same time as the original file. Using the above example, if the file having a creation date of 12/01/2005 and a retention period (in months) of 60 is copied on 12/12/2007, the new file may have a creation date of 12/12/2007 and an adjusted retention period (in months) of 36.

In some environments, it may be necessary or desirable to have some files in a file system with "infinite" retention periods. In other words, there may be some files created within a file system that are never to be deleted by the data lifecycle management mechanism. In one embodiment, these files may simply not be given an expiration policy. In another embodiment, all files in a file system may have an expiration date attribute in the expiration policy stored in the file system metadata, and a special value may be used to signify files that are not to be deleted. For example, an "expiration date" of 00/00/0000 may indicate files that are not to be deleted by the data lifecycle management mechanism. Other embodiments may use other mechanisms to indicate files that are not to be deleted, or combinations of one or more such mechanisms.

As mentioned above, the expiration policies for files, may be maintained by the file system software 100A in file system metadata 122A. File system metadata that may be used to maintain expiration policies may include, but is not limited to, inodes, directories, mapping information in the form of indirect blocks, superblocks, extended attributes of files, catalogs, etc. In general, any file system location or structure that is associated with the files may be used to store and maintain expiration policies as metadata for the files in various embodiments. In one embodiment, a separate database or catalog may be maintained as metadata by the file system for storing the expiration policies of files. For the purpose of this description, the important aspect is that each file may have an expiration policy as metadata associated with the file through some metadata structure maintained at the file system level. The exact metadata mechanism used to maintain the expiration policies is not critical.

Note, however, that some file system software may support particular types of metadata that may be leveraged by some embodiments to store and maintain expiration policies for files. For example, many file systems support extended attributes or similar metadata for storing additional streams of information for files, and some embodiments may leverage the extended attributes or similar metadata to store and maintain expiration policies for the associated files. Note that the term herein extended attributes as used herein includes file system implementations of extended attributes, to emulations of extended attributes (e.g., in Microsoft and Novell Streams), and to other types of metadata (e.g., file "resource forks", such as Apple Macintosh operating systems' Resource Forks) that may be used in a similar way to store extended attributes for files. Generally, extended attributes as used herein may indicate any additional structured storage that is tagged to a particular file or directory. Also note that, while the extended attributes of a file are typically stored with the file, the extended attributes may still be considered part of the file system metadata 122A and not part of the file. Also note that, when a file is copied within the file system 102A, from one file system to another file system (e.g., from file system 102A to file system 102B), from one device to another device, or to a backup image 132 by backup/restore system 130, the extended attributes of the file are typically copied with the file if the other file system and the copy mechanism support extended attributes, even if the two file systems are different. This allows the expiration policy of a file to be typically copied with the file. In this document, the expiration policies may generally be described as being stored in the extended attributes of files. Note that this is exemplary, and is not intended to be limiting, and that other forms of file system metadata may be substituted for extended attributes in various embodiments.

In embodiments, when a file is modified, or when a derivative, modified copy, or new version of the file is generated, the expiration policy of the file, derivative, modified copy, or new version of the file is by default not modified. In other words, all copies, derivatives, and versions of an original file by default maintain the expiration policy of the original file. This may help to insure that all copies, derivatives, and versions of a file are deleted by file expiration mechanism 106 along with the original file when the retention period for the original file expires. Note that, in one embodiment, a secure mechanism to change the expiration policies of files via an API or APIs to the file system software 100A may be provided that may allow an authorized administrator or user to modify the expiration policies of files and/or copies, derivatives and versions of the files if necessary or desired. This mechanism may be used to modify the expiration policies of files, for example to extend or reduce the expiration date of a file or a copy, derivative, or version of an original file.

As noted above, when a file is copied to another file system, for example to file system 102B, the expiration policy of the file may be copied with the file in the metadata associated with the file. For example, file system 102B may represent the file system on a laptop or home computer of an employee of the entity that owns file system 102A. The employee may intentionally or unintentionally copy files from file system 102A onto the laptop, and thus onto file system 102B. Alternatively, file system 102B may be on some other device or system that may or may not be under the direct or indirect control of the entity. Note that file system software 100B that manages file system 102B may or may not include a file expiration mechanism as does file system software 100A. Also note that, as part of security/data lifecycle management policy, an entity may require that all file systems on all devices used by its employees or associates to which copies of the entity's files may be made implement at least the file expiration mechanism component of the data lifecycle management mechanism so that files copied from file system 102A may be deleted when expired.

If file system software 100B does include an implementation of the file expiration mechanism, then copies of files from file system 102A on file system 102B may be expired when the original files on file system 102A expire. Note that an expired file may be deleted by the file expiration mechanism of the file system software or, alternatively, access to the file, including attempts to copy the file, for example by applications 120, may be prevented by the file system software. Other alternatives to deleting files may be used in various embodiments, such as erasing, encrypting, overwriting, or scrambling the contents of files that have passed their retention date, and/or notifying one or more administrators to request access to the files that have passed their retention date.

If files originally copied from file system 102A are copied back from file system 102B to file system 102A, the expiration policy of the original file on file system 102A that was copied to file system 102B as part of the file's metadata is copied back to file system 102A. If the file is copied back before the retention date has passed, then the file may be accessible by applications 120 on file system 102A. There are alternative methods for handling attempts to copy a file back to file system 102A after the retention date of the file. In one embodiment, the copy operation for files whose retention dates have passed may be denied by the file system software 102A, and thus the file is not copied. In another embodiment, the file may be copied to file system 102A, and then later deleted by file expiration mechanism 106. Alternatively, rather than deleting the copied file, access to the file (and to all files that have passed their retention date) may be denied by file system software 102A. Note that, in other embodiments, other alternatives to deleting files may be used, such as erasing, encrypting, overwriting, or scrambling the contents of files that have passed their retention date, and/or notifying one or more administrators to request access to the files that have passed their retention date.

Files in file system 102A may periodically or aperiodically be backed up to backup images 132 by backup system 130. While FIG. 2 only illustrates a backup/restore system 130, it is to be noted that files may also be archived to archive images by an archiving system such as an HSM system (not shown). Backup system 130 may create backup images, and/or an archiving system may create archives, on any of a variety of magnetic or optical backup media including, but not limited to, fixed or removable disk drives, tape, CD-ROM, DVD, removable optical disks, etc, or a combination of one or more thereof. Backup images and archives may be kept for days, weeks, months, years or even indefinitely.

Backup/restore system 130 may maintain a backup catalog 134 that includes a map of all backup images 132 indicating all files in file system 102A that have been backed up to backup images 132, and that may include indications of which backup images 132 include which files and where on the backup images 132 the files are located, among other information. Backup catalog 134 is typically, but not necessarily, stored in file system 102A. Backup catalog 134 and backup images 132 may each also include at least a portion of file system metadata 122A for backed-up files. Note that archiving systems may maintain a similar catalog for files stored in archive images, and that archive images and catalogs may also include at least a portion of file system metadata 122A for archived files.

For simplicity, this document generally discusses embodiments in which a backup system is used to store files and file metadata (including, but not limited to, expiration policies) to backup images and backup catalogs, and will generally refer to the "backup catalog," "backup images" and "backups" or "backup operations". It is to be noted that other systems, such as archiving systems (e.g., HSM systems) may be used to store files and file metadata (including, but not limited to, expiration policies) to images (e.g., archive images) and catalogs (e.g., archive catalogs), and so anywhere "backup system" and related terms are used, embodiments that may use these other mechanisms are implied.

In one embodiment, the expiration policies of files in the file system metadata 122A may be written to the backup images 132 with the files when the files are backed up by backup/restore system 130. In one embodiment, as described below, the expiration policy definitions for files may be stored in the backup catalog 134 by the backup/restore system 130 when the files are periodically or aperiodically backed up, and may then be used to recover the expiration policy for files that have been copied onto file systems that do not support extended attributes or that have been copied using mechanisms that do not support extended attributes, and thus have lost their associated expiration policies. In one embodiment, the expiration policy stored with the file in a backup (or archive) image may be used to rebuild the catalog information in the event of its loss from the catalog (e.g. during disaster recovery). In one embodiment, the expiration policy stored with the file in a backup (or archive) image may be used by the restore system to enforce the expiration policy during restore of the file, for example if the expiration policy cannot be found in the catalog.

Individual files, selected sets or groups of files, or even entire backup images may be restored to file system 102A from backup images 132 (or, alternatively, from archive images) by a restore mechanism for various reasons. For the sake of this discussion, it is assumed that the restore mechanism is part of backup/restore system 130, although it should be noted that the restore mechanism may be implemented separately from backup/restore system 130. In one embodiment, the restore mechanism may be configured to restore files from a backup image 132 through the file system software 100A. File system software 100A may prevent files that have passed their retention date as recorded on the backup image from being restored to file system 102A. Alternatively, the files may be restored, and then later deleted, or alternatively access may be denied to the restored files that have passed their retention date by the file system software 100A. Note again that other alternatives to deleting files may be used, such as erasing, encrypting, overwriting, or scrambling the contents of files that have passed their retention date, and/or notifying one or more administrators to request access to the files that have passed their retention date.

In another embodiment, the restore mechanism may be configured to check the expiration policies of files that it attempts to restore from a backup image 132, and to not restore files to the file system that have passed their retention date.

Note that some file systems, such as FAT and FAT32 file systems, may not support extended attributes for files, and thus the extended attributes of a file, including its expiration policy, may be lost when a file is copied to the file system. In addition, many email systems, and some file copying mechanisms, may not support extended attributes, and thus the extended attributes of a file, including its expiration policy, may be lost when a file is copied using one of these systems or mechanisms. Other situations may occur where the expiration policy of a file, a copy of a file, or a derivative of a file is lost. Therefore, embodiments may provide a mechanism or mechanisms for handling situations where the expiration policy of a copied file is lost, as described later in this document.

Figure 3:
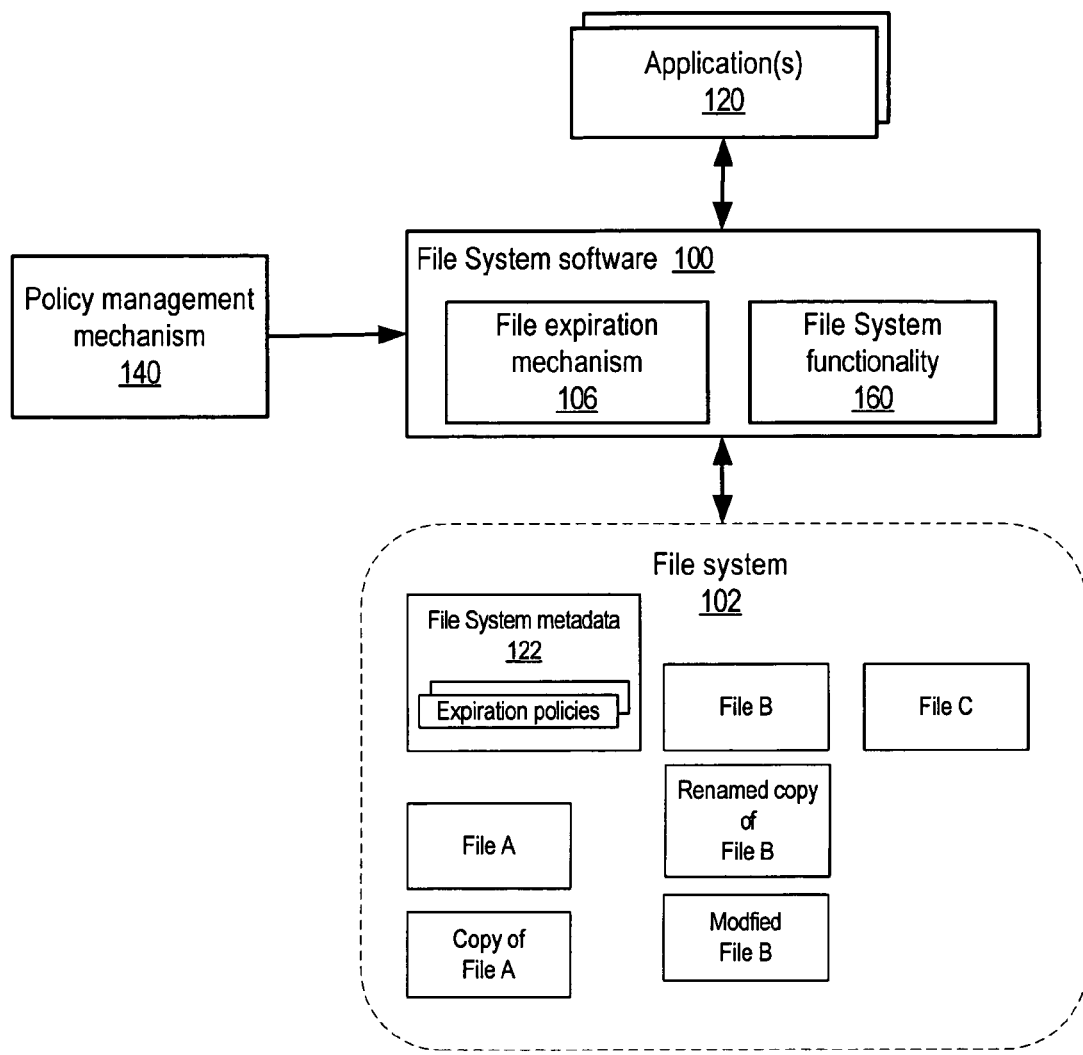
FIG. 3 illustrates an exemplary file system implementing a data lifecycle management mechanism and a policy management mechanism according to one embodiment.

Some embodiments may provide a policy management mechanism that interacts with the file system software to manage and control aspects of the data lifecycle management mechanism for compliance purposes. FIG. 3 illustrates an exemplary file system implementing a data lifecycle management mechanism and a policy management mechanism according to one embodiment. Policy management mechanism 140 may, for example, be a separate application or component of an application that is implemented on the same or on a different system as file system software 100, or may alternatively be integrated in file system software 100. In one embodiment, a policy management mechanism 140 may scan the file system 102 for files with particular traits (e.g. file type, creator/owner (whether user, position, application, department, etc.), file extension, etc.), and when found may identify one or more files as being potentially controlled files. Once a file is identified as a potentially controlled file, the policy management mechanism 140 may make a file system call to file expiration mechanism 106 of file system software 100 that specifies the file and an expiration policy for the file. From that point on, the file expiration mechanism 106 of file system software 100 may ensure that any derivatives of or copies made of the file include the file expiration policy, and file expiration mechanism 106 of file system software 100 may delete the file and copies or derivatives of the file on or after the expiration date specified by the expiration policy. On or near the date the file is to be deleted (the deletion window, or how often to groom the file system, may be specified by the policy management mechanism 140), the file expiration mechanism 106, as part of a data lifecycle management grooming operation, may delete the file and any copies or derivatives of the file that can be located, or alternatively may perform some other action or actions for the file as specified by the file's expiration policy. Access to copies or derivatives of the file that are stored elsewhere may also be prevented by the file expiration mechanism 106 of file system software 100, and copies or derivatives of the file that are moved or restored back to the file system may also be deleted by the file expiration mechanism 106 of file system software 100, or alternatively access to the files may be denied. Note that other embodiments may perform other actions than deleting or denying access to expired files as specified by the file expiration policies.

One embodiment may provide one or more file system APIs that allow a policy management mechanism 140 to specify the expiration policy for files and to perform other data lifecycle management-related operations. In one embodiment, once the expiration policy for a file is established, only the policy management mechanism 140 may be allowed to modify the expiration policy. In addition to modifying the expiration policy, the policy management mechanism 140 may be configured to control the file system actions necessary to control data lifecycle management-related file system actions for files in file system 102. For example, the actions a policy management mechanism 140 may control may include one or more of, but are not limited to, setting how often to perform the deletion of files and how thorough a deletion to do (i.e., a simple deletion, write over data, secure clean, etc.).

In one embodiment, control of the compliance operations on file system 102 by a policy management mechanism 140 may require a security protocol established between the policy management mechanism 140 and the file system software 100. There are a number of methods that may be used for the security protocol including, but not limited to, public/private key technology.

Conventionally, compliance control for data lifecycles is managed outside the file system and is not integrated with the file system. Embodiments of the data lifecycle management mechanism are integrated with the file system and file system software, unlike conventional mechanisms. Having the creation and maintenance of expiration policies and the deletion of files be the file system software's responsibility ensures that expired files are deleted even if an external compliance application (e.g., policy management mechanism 140) is replaced, or if there is more than one external application or mechanism that may manage or modify file expiration policies.

Figure 4:
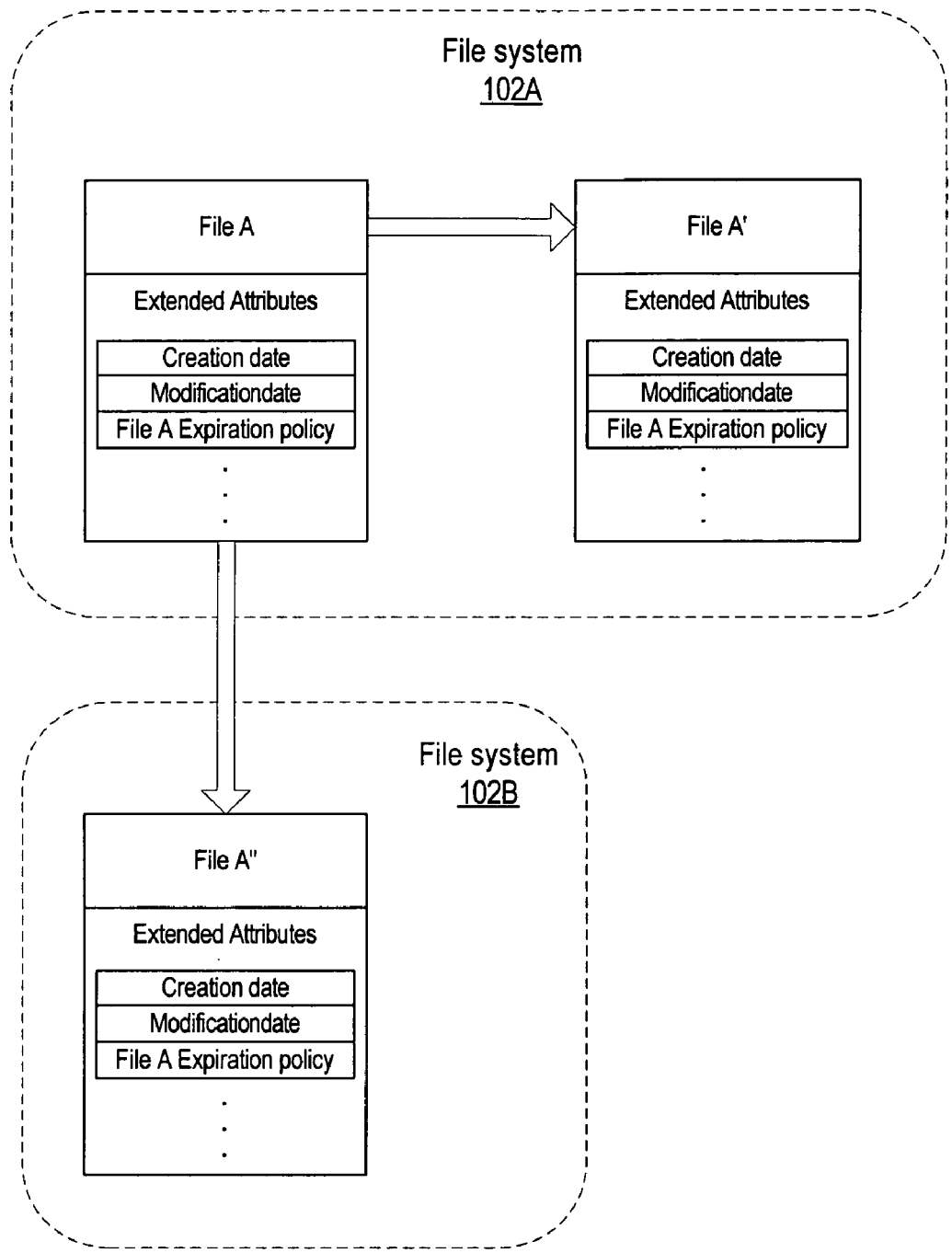
FIG. 4 illustrates an exemplary file system implementing a data lifecycle management mechanism that uses extended attributes of files to store expiration policies according to one embodiment.

FIG. 4 illustrates an exemplary file system implementing a data lifecycle management mechanism that uses extended attributes of files to store expiration policies according to one embodiment. Embodiments of the data lifecycle management mechanism may be used to implement a policy-based, automated system to manage the automatic expiration and deletion of files which may be needed for compliance reasons imposed by internal or external regulations, but which may be stored as many different copies during data protection (e.g. in backup images) and other duplication activities, such as sending the files via email or copying the files to different file systems using some other copy mechanism or mechanisms.

Many if not most modern file systems support extended attributes for files for storing additional metadata for a file. Extended attributes or their equivalent (Microsoft and Novell Streams, Apple Resource Forks, etc.) are available, for example, on standard UNIX file systems (e.g., UFS and NFS v4 (Solaris 9 at least onwards)); on LINUX file systems (e.g., EXT2FS, and by inference EXT3FS); on Microsoft's Windows file systems (e.g., NTFS and CIFS); on Apple's Macintosh OS HFS, OS X's HFS+, and Apple File protocol); and on the NetWare file system. Other operating systems, such as OS X UFS, may or may not support extended attributes, but support for extended attributes may be added to those that do not over time. Since NFS v4, CIFS, NetWare and Apple File Protocol provide explicit support for extended attributes, most network I/O for home directory storage and in corporate server support may already support extended attributes, and more likely will in the future, as a trend in operating/file systems and network protocols is to support extended attributes for files. In addition, file systems such as VERITAS File System (VxFS), may already provide support for extended attributes, or if they do not may be enhanced to provide extended attribute support if it is not available in current implementations. Also note that various copying and replicating, utilities, such as file replicators, storage replicators, and backup systems, may support extended attributes, or may be enhanced to support the replication or copying of extended attributes if not already supported.

Some embodiments of the data lifecycle management mechanism may use the extended attributes of files to store expiration policies for the files. In some embodiments, the extended attribute store of a file may be used to define a policy for expiring the file. The expiration policy may be as simple as an expiration (or deletion) date for the file, or a more complex policy that specifies one or more metrics to be evaluated to determine if a file is to be expired. In one embodiment, the expiration policy definition may also specify one or more actions, or a combination or series of actions, to be taken if the file has expired. This action may be, for example, the immediate deletion of the file, not deleting the file and returning EACCES (UNIX/LINUX) ERROR_ACCESS_DENIED (Windows), or a similar error message on other operating systems so that the file still exist in the file system but is inaccessible by clients, or some other action or actions. Some embodiments may use security technology to protect the expiration policy definitions in the extended attributes of the files from being accessed or modified by unauthorized identities (people and/or systems.)

In FIG. 4, on file system 102A, a file A may be created, for example by an application. When the file A is created, the file system software (not shown in this Figure) generates extended attributes for the file A. Extended attributes may include, for example, a creation date attribute that indicates the date (and possibly time) that the file was created. Extended attributes may also include a modification date indicating the last date (and possibly time) that the file was modified. Initially, the modification date may be the same as the creation date. Other information relevant to the file, for example information on the user and/or application that caused the file to be created, may be included in the extended attributes.

A file expiration mechanism of the file system software may generate an expiration date for the file A, and store the expiration date in an expiration policy in the extended attributes. In one embodiment, an expiration date may be generated in accordance with a retention period for files of the type of file A on file system 102A as specified through a policy management mechanism as described in FIG. 2. Note that other information about the file A, such as what user, position, or department the file belongs to or was created by or what application generated the file, may be used in determining the expiration date.

The expiration policy may be generated and added to the extended attributes of the file A by the file expiration mechanism at the time of creation or, alternatively, at some later time. In one embodiment, file expiration mechanism may include a filter driver that sits above the file system software but that is conceptually at the file system level and not at the application level may add the expiration policy to the extended attributes of the file A at the time of creation by intercepting the file creation call from an application to the file system software. In another embodiment, the generation of expiration policies for files and the addition of the expiration policies to the extended attributes may be file expiration mechanism functionality integrated in the file system software itself. Note that other embodiments may use other mechanisms at the file system level to generate expiration policies for files in the file system 102A.

At some point after file A is created, a copy of File A (File A') may be generated in the file system 102A, for example by a user via an application or via the file system software, by an application, or by the file system software itself. Extended attributes for the new file A' are created or copied by the file system software. The expiration policy for File A is copied as part of the extended attributes for File A', so that both files have the same expiration policy. File A' may then be modified, moved, copied to another system, etc., just like any other file. Any such operation on file A' retains the expiration policy for File A in the extended attributes of File A' or its copies or derivates. Specifically, if a copy of File A' is generated, then the expiration policy for File A (which is also the expiration policy for File A') is included in the extended attributes of the new copy of file A'. Thus, all copies, derivatives, versions, and copies of copies of File A on file system 102A have the same expiration policy as the original File A. An exception to this may be if an authorized user uses a secure policy management mechanism such as the one illustrated in FIG. 2 to modify the expiration policy of File A and/or one or more of its copies or derivatives according to some compliance regulation for a particular version or copy of the original File A.

At some point after file A is created, a copy of File A (File A"), or of one of its copies or derivatives, may be made from file system 102A to file system 102B, for example by a user via an application, by an application, by the file system software itself. Assuming file system 102B supports extended attributes, extended attributes of the copied file on file system 102A are also copied with File A" to file system 102B. The expiration policy for File A is copied as part of the extended attributes, so that both the copied file on file system 102A and File A" on file system 102B have the same expiration policy (File A expiration policy). File A" on file system 102B may then be modified, moved, copied to another system, etc., just like any other file. Any such operation on File A" retains the expiration policy for File A in the extended attributes of File A". Specifically, if a copy of File A" is generated, then the expiration policy for the File A" (which is also the expiration policy for File A) is included in the extended attributes of the new copy of File A". Thus, all copies, derivatives, versions, and copies of copies of File A or of File A" on file system 102B, or on other systems, have the same expiration policy as the original File A on file system 102A. An exception to this may be if an authorized user uses a secure policy management mechanism such as the one described for FIG. 2 to modify the retention date of File A" and/or one or more of its copies, for example to meet some compliance regulation.

Note that, since many operating and file systems support extended attributes, and more will probably add support for extended attributes in the future, adding the expiration policy to the extended attributes of files may allow file expiration to be imposed on files that are copied from an original system to other systems, whether the other systems use the same file system/operating system as the original system or not. If a system implements an embodiment of the file expiration mechanism as described herein, the file expiration mechanism on that system may enforce the file expiration policies for all files in its associated file system, whether the files and their associated expiration policies originated on that system or were copied from another system.

For systems that support extended attributes but do not implement an embodiment of the file expiration mechanism, including the file expiration policies in extended attributes maintains the file expiration policies for files copied to those systems, so that if the files are copied back to the original system or to another system that implements the file expiration mechanism, the file expiration policies of the files may be enforced without having to attempt to recover the original file expiration policy.

Further, if an attempt is made to access a file on a file system with an expiration policy stored in the extended attributes of the file from. another system that implements an embodiment of the file expiration mechanism, the file expiration policy on the accessing system may evaluate the expiration policy of the file and take whatever appropriate action is specified in the expiration policy, such as denying access to the file, even if the file system on which the file resides does not implement the file expiration policy.

Figure 5:
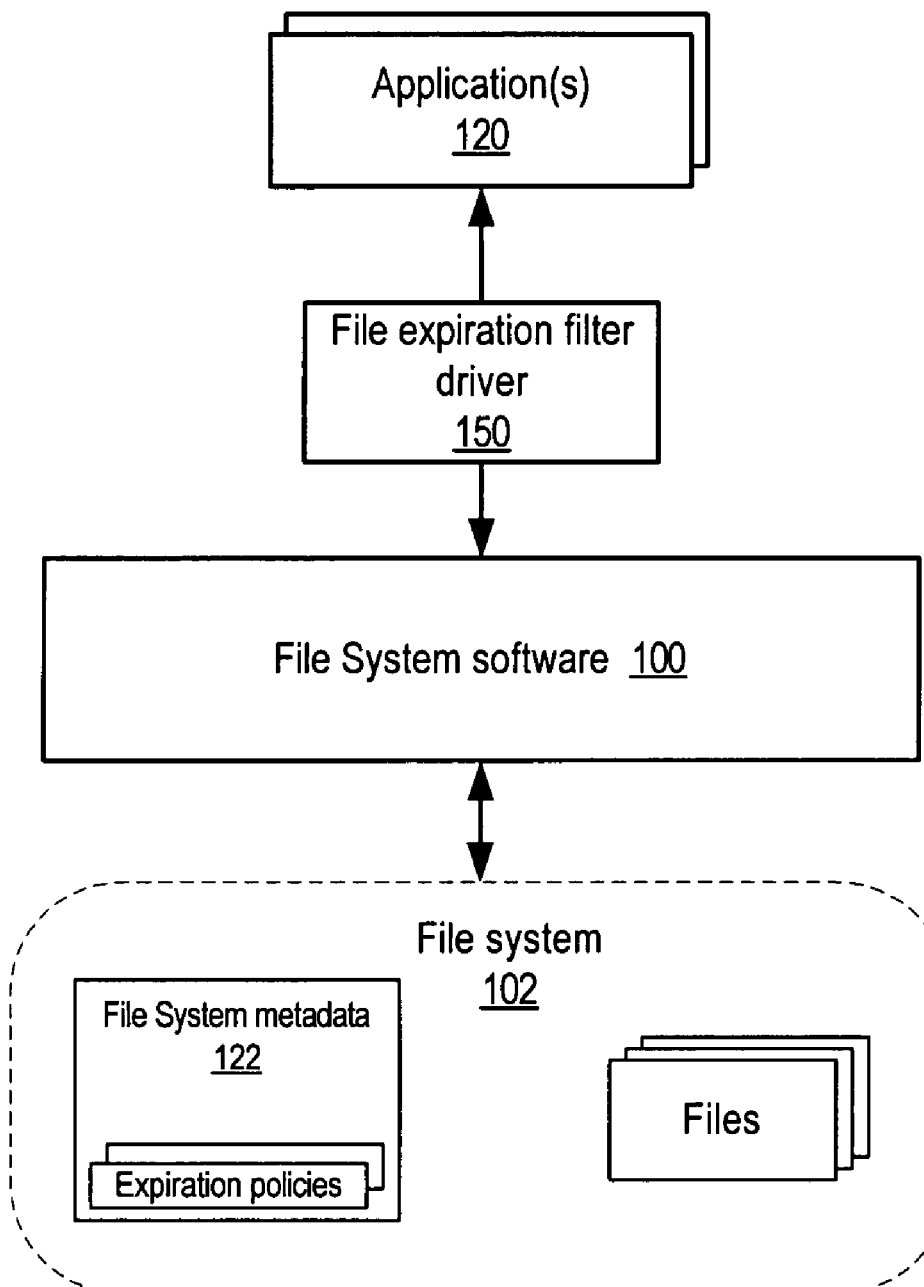
FIG. 5 illustrates a file system implementation with a file expiration filter driver between the application(s) and the file system software according to one embodiment.

Some operating systems, such as at least some Microsoft Windows operating systems and UNIX/LINUX, may provide a filter driver or similar mechanism that allows the interception of file system calls between applications and the file system (e.g., before the calls reach the standard file system driver). In some embodiments, this interception mechanism may be used to implement at least part of the functionality of the file expiration mechanism, for example at least part of the functionality previously described for the policy engine component. FIG. 5 illustrates a file system implementation with a file expiration filter driver between the application(s) and the file system software according to one embodiment. In this embodiment, file expiration filter driver 150 may intercept file system calls from the application to the file system software, test the file system calls against the expiration policy (if any) for the referenced files, and take the appropriate action or actions in accordance with the files' expiration policies. For example, when open (2) (UNIX/LINUX), CreateFile( ) (Windows), or a similar function in another operating system is called for a file, the filter driver 150 may intercept the call, the expiration policy for the file may be tested by the filter driver 150, and the appropriate action taken by the filter driver 150 in accordance with the file's expiration policy. For example, if a call is intercepted for a particular file, and the expiration policy for that file indicates that the file has passed its expiration date, an ACCESS DENIED or similar error may be returned to the calling application, or some other action specified by the expiration policy for the file may be taken. Note that the expiration policy filter driver 150 on a file system could thus deny access to files on the file system, no matter where the calls originated from, even if the files originated on another file system and were copied to the file system. Also note that, in one embodiment, the expiration policy filter driver 150 on a file system may also deny access to files with associated expiration policies stored in the extended attributes of the files on another file system even if the other file system on which the files reside does not implement an embodiment of the file expiration mechanism.

An embodiment providing file expiration functionality at the filter driver level (in other words, between the application level and the file system software) in various operating systems, such as UNIX/LINUX and Microsoft Windows operating systems, may allow the increased likelihood of successful policy testing as files are copied among various operating/file systems on various devices. For example, a user's personal computer which does not have the file expiration filter driver 150 may still be denied access to a file if the personal computer connects to a file share that was based on an operating/file system, such as UNIX with VERITAS VxFS, that does implement the file expiration filter driver 150. Similarly, a file expiration filter driver 150 on a Windows system may intercept a file if the underlying file system is not configured to test expiration policies, either locally or remotely. Also note that, in one embodiment, a file system may include an implementation the file expiration filter driver 150 that implements the functionality of the policy engine described in FIG. 1 without having some or even any of the other functionality described in FIG. 1 for the file expiration mechanism. As another example, a client system may have a filter driver 150 installed and connected to a network redirector for remote file system access that is configured to provide at least some of the functionality of the data lifecycle management mechanism described herein for enforcing expiration policies on file accesses to and from the client system. The filter driver may, for example, protect file access on the client system even if the file system software on a remote server or other system that tries to access files on the client system does not include an implementation of the data lifecycle management mechanism. For example, if the remote server tries to copy a file from the client system, the filter driver may examine an expiration policy for the file and block the file copy if the file has passed its expiration date.

Some embodiments may provide mechanisms for handling File Systems and file copying mechanisms that do not support extended attributes. FIG. 4 illustrates an exemplary embodiment that stores file expiration policies in the extended attributes of files. While many operating systems, file systems, and network protocols support extended attributes for files, some file systems, such as FAT and FAT32 file systems, many email systems, copy and paste operations, FTP, and possibly other such copying mechanisms do not directly support extended attributes for files. FAT and FAT32 file systems are still widely used, and email is a common way of exchanging files. FAT and FAT32 file systems are often used on removable storage such as flash memory cards, floppy discs, zip drives, USB and Firewire drives, iPods, etc. For security reasons, the IT security policies of organizations may forbid the use of such devices, and indeed that security measure is not uncommon. Consequently, a corporate security policy that forbids the copying of a file onto certain file systems such as FAT or FAT32 may be desirable from a customer's point of view, and such a policy may aid in the implementation of the data lifecycle management mechanism described herein. Note that, in one embodiment of the data lifecycle management mechanism, a security policy forbidding the copying of files to certain file systems such as FAT and FAT32 file systems may be enforced by the file system software when a copy request to such a system is made. For example, in one embodiment, a file expiration filter driver as described above may intercept copy requests to the file system, evaluate the copy requests to see if the target is an allowed file system, and if it is not deny the copy request. Note that other mechanisms for denying such copy requests may be used in other embodiments. Also note that a similar corporate security policy may be enacted for other file copy mechanisms, such as email, that do not support extended attributes for files, and embodiments of the data lifecycle management mechanism may be used to implement and enforce those policies.

Note that some entities may not desire such a 'no FAT/FAT32' security policy, and therefore some embodiments of the data lifecycle management mechanism may implement one or more mechanisms for handling file systems, file transfer/copy mechanisms, and other technologies that do not support extended attributes for files. In some embodiments, a filter driver or other component of the file expiration mechanism may be configured to split up and reconstitute files with extended attributes, for example by creating a second file including the extended attributes and a similar name as the original file. Both files may then be joined together again by the file expiration mechanism when the files are copied back onto a file system that does support extended attributes and that implements an embodiment of the file expiration mechanism. In some embodiments, as an alternative to a mechanism for splitting and reconstituting a file and its extended attributes, for email, copy and paste, and similar common procedures that may not directly support extended attributes for files, a MIME format, clipboard encoding format, or alternatively some other format may be used to transfer the extended attribute data with files. Some embodiments may implement both of the above mechanisms for handling cases where file are copied or transferred to file systems or by mechanisms that do not support extended attributes.

Both of the above mechanisms for handling cases where file are copied or transferred to file systems or by mechanisms that do not support extended attributes may be specific to particular technologies and may not work if those technologies are not available, and may also be subject to user error or avoidance. Therefore, in some embodiments of the data lifecycle management mechanism, a copy of the expiration policy definition of files from the file system metadata may be stored in a catalog or database on the file system that implements the data lifecycle management mechanism.

In some embodiments, a mechanism that periodically or aperiodically scans the file system, such as a virus protection mechanism or backup system, may be configured to store the expiration policy definition of the files in a catalog or database. This application or utility may be referred to herein as a scan mechanism. The catalog (or database) may be a catalog maintained by a system or application such as a backup catalog that is leveraged for use by the policy-based data lifecycle management mechanism, or alternatively may be a dedicated list, catalog, or database of the policy-based data lifecycle management mechanism. Exemplary scan mechanisms that may be used in various embodiments may include, but are not limited to, one or more of backup/restore systems, archiving systems such as Hierarchical Storage Management (HSM) systems, Storage Resource Management (SRM) systems, Virus Scanning systems, and in general any mechanism or system that scans file systems, and that maintains or may be modified to maintain information on files found in the file system in a catalog, database, etc. In some embodiments, two or more such scan mechanisms may be leveraged to store copies of the expiration policies for the files in a catalog or database. Note that, in one embodiment, rather than leveraging an existing scan mechanism, a dedicated mechanism that scans file systems and stores information on files found, including expiration policies, for the purposes of policy-based data lifecycle management as described herein may be implemented.

For simplicity, this document discusses an embodiment in which a backup system is used as the scan mechanism, and will generally refer to the "backup catalog," "backup images" and "backups" or "backup operations", but note that any application, utility, or service that manages stored images, scanning operations and a catalog may be used in various embodiments, and that the catalog used may be a catalog maintained by the scan mechanism and leveraged for use by the policy-based data lifecycle management mechanism or, alternatively, a catalog maintained specifically for the purposes of the policy-based data lifecycle management mechanism.

As noted, in one embodiment, the backup system software may be configured to store the expiration policy definition for files in the backup catalog when the files are periodically or aperiodically backed up. In one embodiment, the backup system may also be configured to store the expiration policy definition for the files in the backup images with the files when the files are backed up. The data lifecycle management mechanism may then recover the expiration policy definition for a file, if necessary, from the catalog or a backup image, for example if and when the file is copied back onto the file system from another file system, or when a file has been copied using a copy mechanism that does not support extended attributes. In one embodiment, the catalog may also be accessed to determine the expiration policy for a file if an attempt is made to open a copy of a file on a file system that does not support extended attributes. An exemplary application of expiration policies stored in a catalog (e.g., a backup catalog) is to support the modification of the expiration policies for files after the files have been backed up or archived, and possibly deleted from the file system itself. It may not be possible to update the expiration policies stored in the archive/backup image. Instead, the expiration policies stored in the catalog are updated. On an attempt to restore a file from an archive/backup image, the correct expiration policy for the file may be recovered and applied from the catalog, as the expiration policy which may be stored with the file on the archive/backup image may be out of date.

FIGS. 6A through 6H illustrate an exemplary file system implementing an embodiment of the data lifecycle management mechanism where a backup/restore system is configured to store copies of expiration policies for files in a backup catalog and in backup images. Note that FIGS. 6A through 6H are exemplary, and that other mechanisms than a backup/restore system may be used to perform at least some of the functionalities described herein in other embodiments.

Figure 6A:
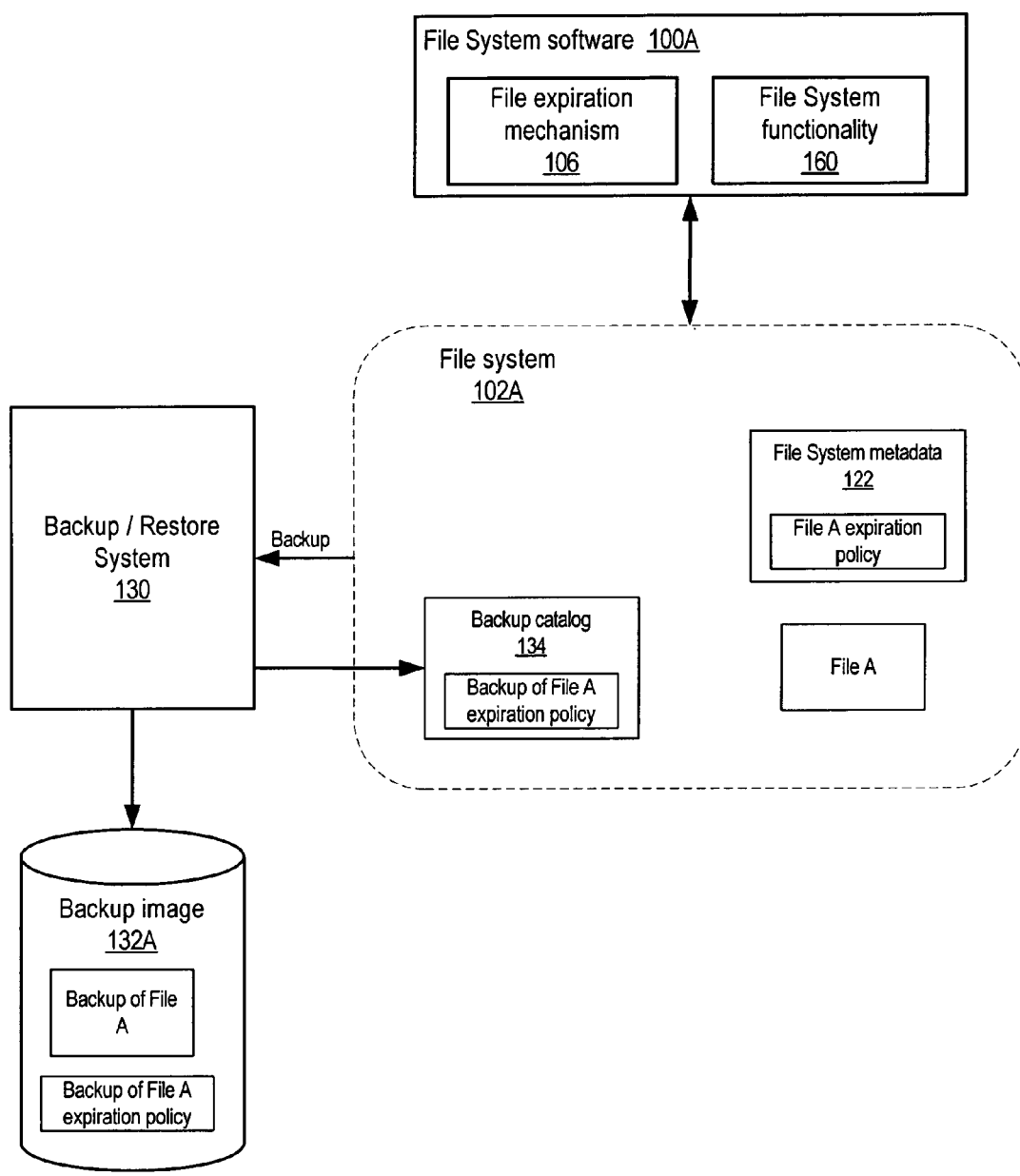
FIGS. 6A through 6H illustrate various operations of an exemplary file system implementing an embodiment of the data lifecycle management mechanism where a backup system is configured to store backups of expiration policies for files in a backup catalog and in backup images.

In FIG. 6A, a File A has been created on file system 102A that implements an embodiment of the data lifecycle management mechanism. File expiration mechanism 106 generates an expiration policy for File A and stores the expiration policy in the file system metadata 122 for the file (e.g., in the extended attributes of File A). After File A is created, during a subsequent backup of the file system 102A by backup/restore system 130, File A may be backed up, and a backup of File A expiration policy may be written to the backup catalog 134 and to the backup image 132A (with File A) by the backup/restore system 130.

Figure 6B:
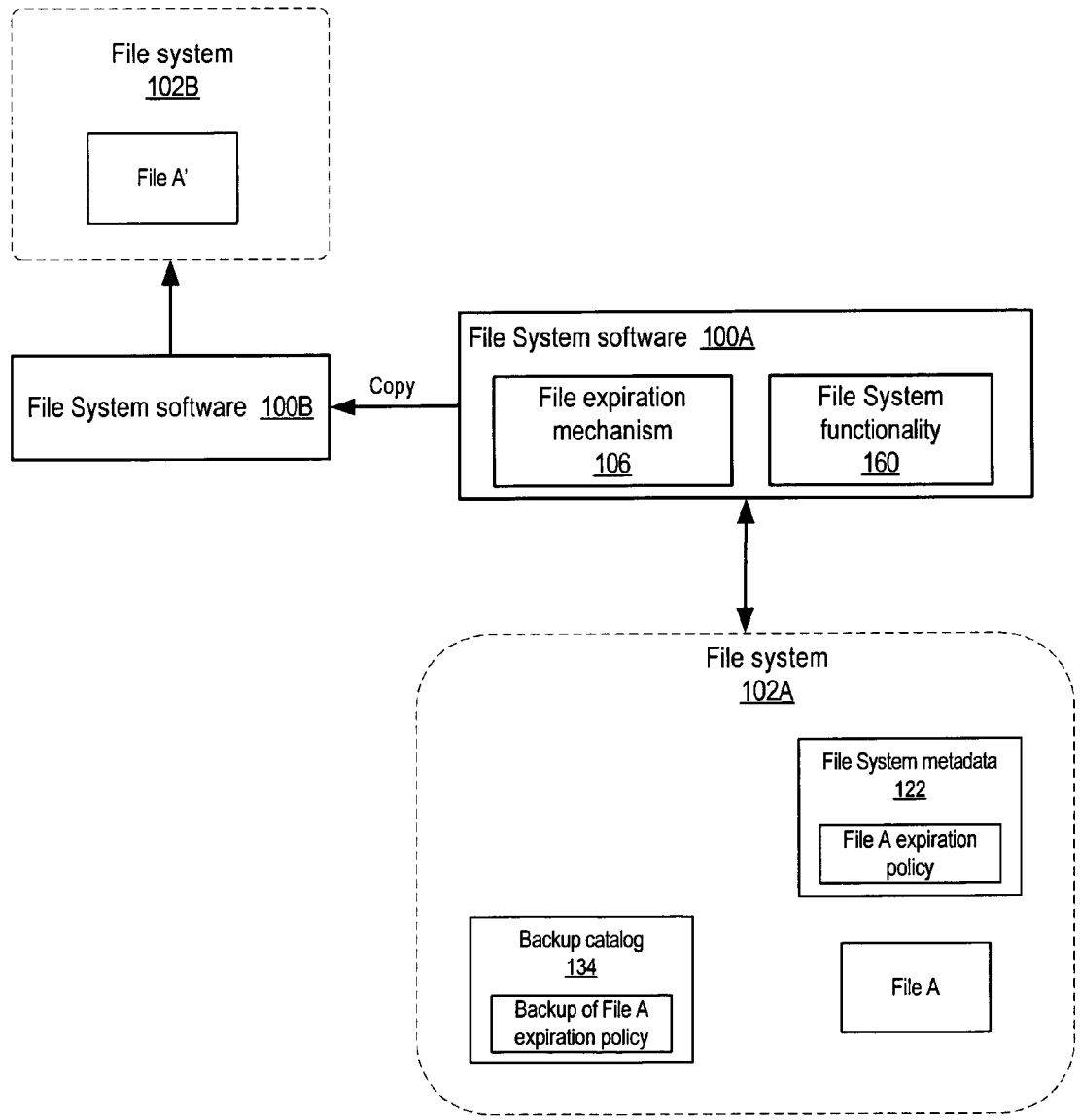

In FIG. 6B, a copy of File A (File A') may be made to another file system 102B. File system 102B may not support file system metadata 122 (e.g., extended attributes), or the copy mechanism itself, such as email or FTP, may not support the transfer of file system metadata 122, and thus the File A expiration policy may not be transferred to file system 102B with File A.

Figure 6C:
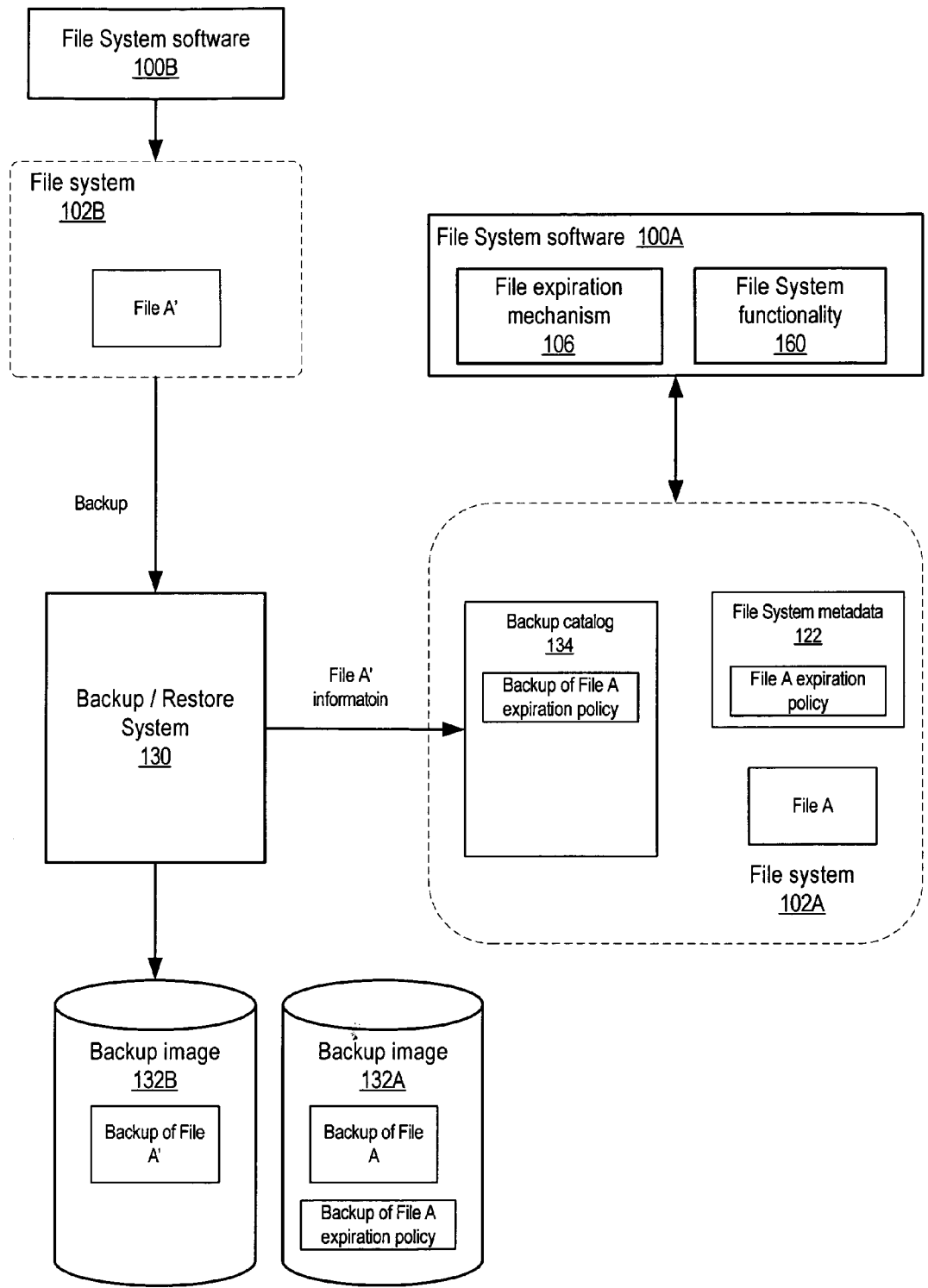

In FIG. 6C, in one embodiment, backup/restore system 130 may perform a backup operation that includes file system 102B, and thus may back up File A' on file system 102B to backup image 132B. Since there is no expiration policy for File A' at this time, no expiration policy may be backed up with File A'. Note that other information on File A' may be written to the backup catalog 134 during the backup operation.

Figure 6D:
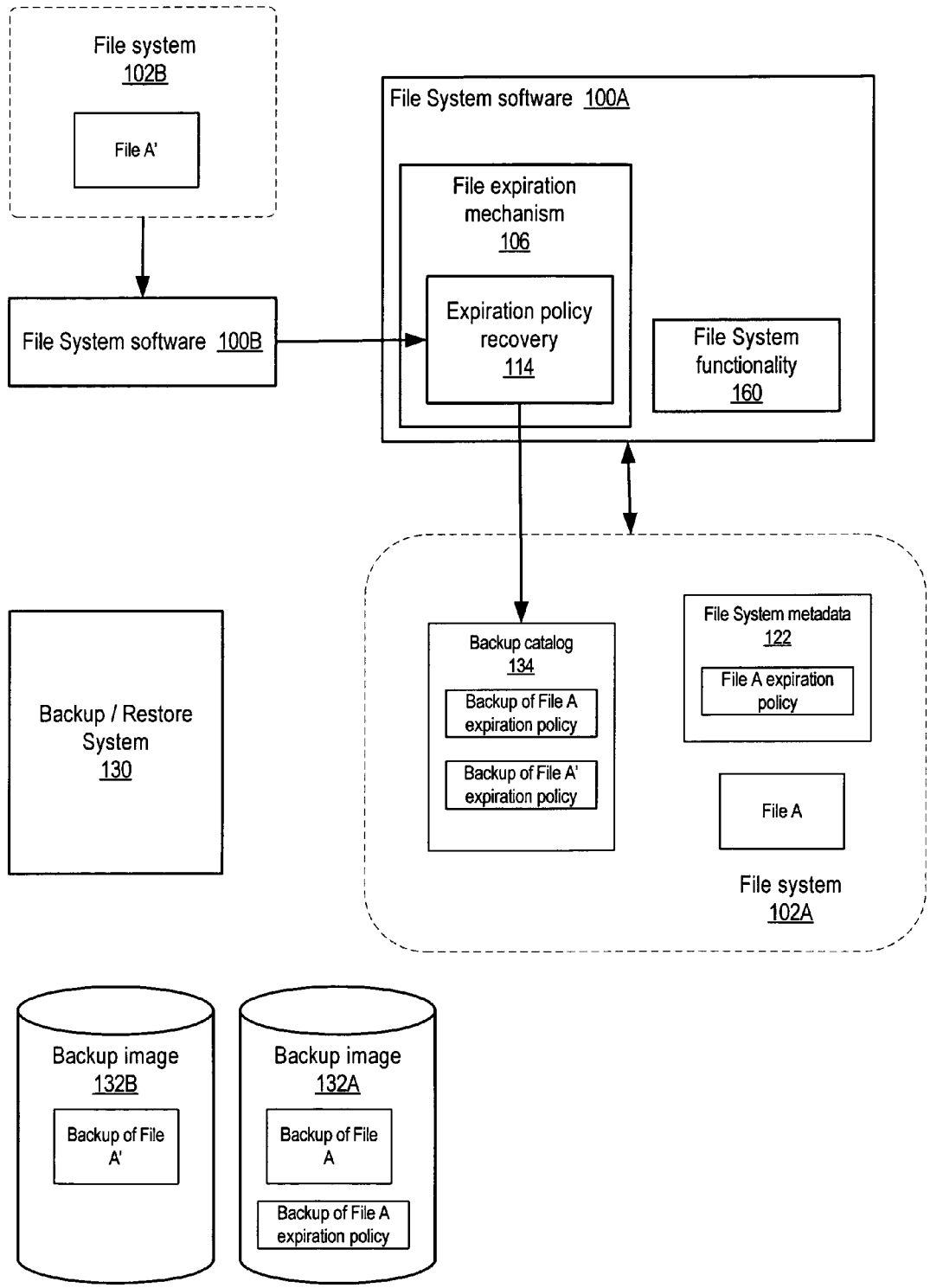

In FIG. 6D, in one embodiment, an expiration policy recovery 114 mechanism of file expiration mechanism 106 may identify File A' on file system 102B as related to File A on file system 102A, and may duplicate File A expiration policy and attach it to the entry for File A' in the backup catalog 134 as backup of File A' expiration policy. Expiration policy recovery 114 mechanism may use one or more metrics from a File in attempting to associate another File without an associated expiration policy with the File (and its associated expiration policy) on file system 102A. The functionality of expiration policy recovery 114 mechanism is further described below.

Note that original File A may have been deleted from file system 102A. In one embodiment, expiration policy recovery 114 mechanism may be configured to identify File A' as related to File A from the backup of File A expiration policy, and possibly other information on File A, stored in backup catalog 134, or alternatively from a store of File A and its expiration policy on a backup image 132.

Also note that one or more copies of File A may have been generated on file system 102A, and/or on other file systems (one or more of these copies may be modified, and thus may not be identical to File A). The File A expiration policy may be copied into the file system metadata 122 for the copies of File A, and may also be added to backup catalog 134 and a backup image 130 for the copies of File A, as described herein. In one embodiment, expiration policy recovery 114 mechanism may be configured to identify File A' as related to File A by comparing File A' to one of the copies of File A.

Figure 6E:
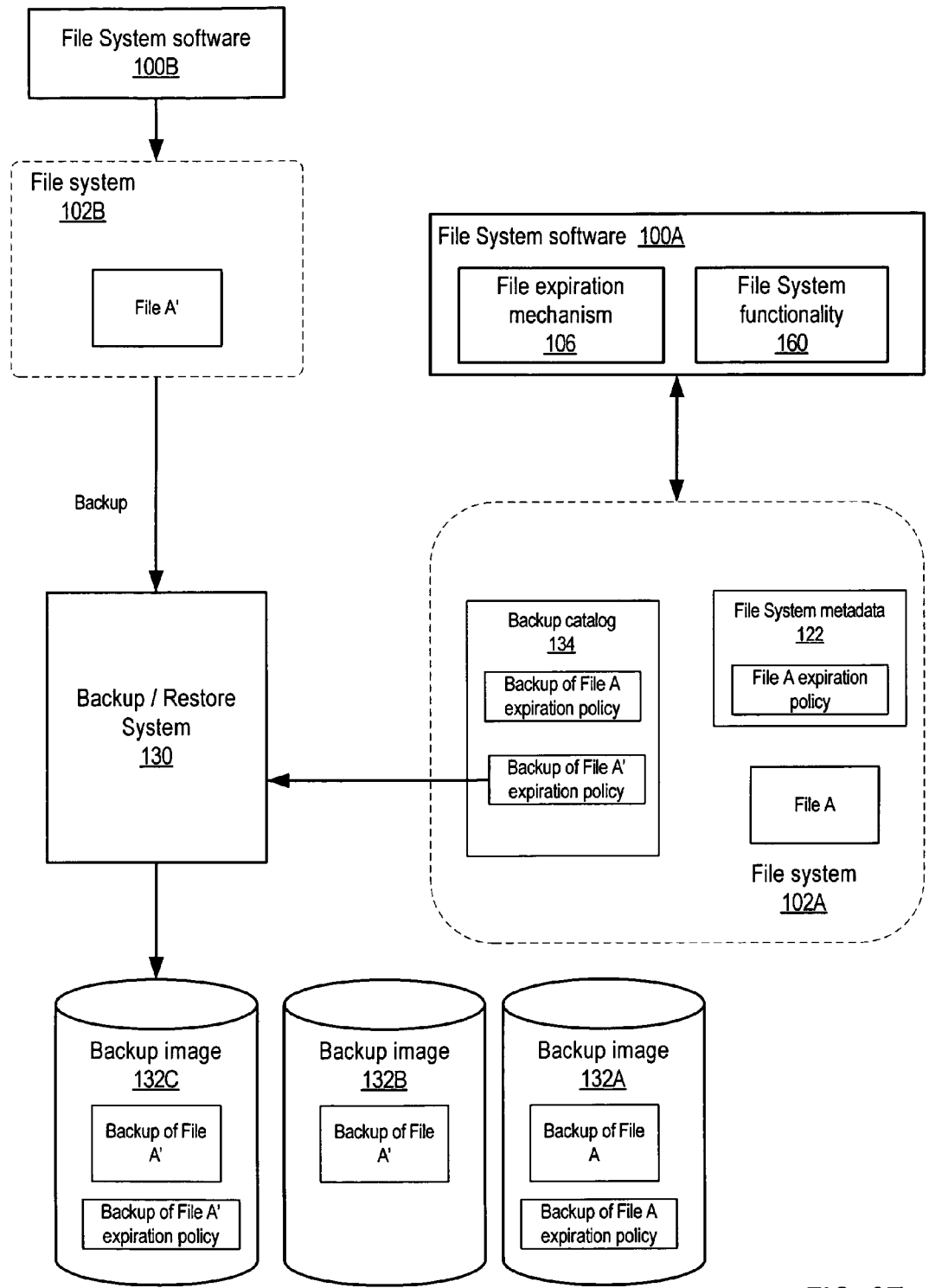

In FIG. 6E, in one embodiment, backup/restore system 130 may perform another backup operation that includes file system 102B, and thus may back up File A' on file system 102B to backup image 132C along with backup of File A' expiration policy from backup catalog 134 to backup image 132C.

Note that the order of events depicted in FIGS. 6C through 6E is exemplary and may be different in some embodiments. For example, in one embodiment, expiration policy recovery 114 mechanism may identify File A' on file system 102B as related to File A on file system 102A prior to the backup of file system 102B as described in FIG. 6D, and may duplicate File A expiration policy and add it to backup catalog 134 as backup of File A' expiration policy. The next backup operation performed by backup/restore system 130 on file system 102B thus may back up File A' on file system 102B and backup of File A' expiration policy from backup catalog 134 to a backup image 132, as described for FIG. 6E. Note that other information on File A' may be written to the backup catalog 134 during the backup operation.

In one embodiment, rather than duplicating File A expiration policy and adding it to backup catalog 134 as backup of File A' expiration policy, expiration policy recovery 114 mechanism may store information identifying the two Files A and A' as related elsewhere, for example in a separate list of files that have been identified as related. In one embodiment, backup/restore system 130 may be configured to access this information during a backup operation on file system 102B to identify File A' on file system 102B as related to File A on file system 102A. Backup system 130 may then duplicate backup of File A expiration policy in backup catalog 134 and add it to backup catalog 134 with an entry for File A' as backup of File A' expiration policy, and back up File A' on file system 102B to a backup image 132 along with backup of File A' expiration policy.

As another example, in one embodiment, File A' may be identified as related to File A by as part of a backup operation on file system 102B by backup/restore system 130. In this embodiment, backup of File A' expiration policy may be added to backup catalog 134 with an entry for File A' and backed up to a backup image 132 (along with File A') during a backup operation by backup/restore system 130. Alternatively, File A' may be identified as related to File A by a scan operation performed by backup/restore system 130 separate from a backup operation.

Note that other embodiments may use other mechanisms than those described above to identify a File without an expiration policy as related to another File with an expiration policy, and to update the backup catalog 134 entry for the first file by duplicating the expiration policy for the second file. For example, in various embodiments, files may be identified as related and the backup catalog 134 may be updated with expiration policies for files that do not have expiration policies but that have been identified as being related to other files during other file system scanning operations such as an anti-virus scan performed by an anti-virus system, an SRM scan performed by an SRM system, or an HSM scan performed by an HSM system.

In one embodiment, rather than having this functionality integrated into a scan operation of an existing scan mechanism such as a backup system, anti-virus system, HSM system, SRM system, etc., the data lifecycle management mechanism may include a separate application, utility or component configured to periodically or aperiodically perform scan operations specifically for the purpose of identifying Files without expiration policies as related to other Files with expiration policies and updating the backup catalog 134 entry for Files without expiration policies with copies of expiration policies from related Files, if found.

Figure 6F:
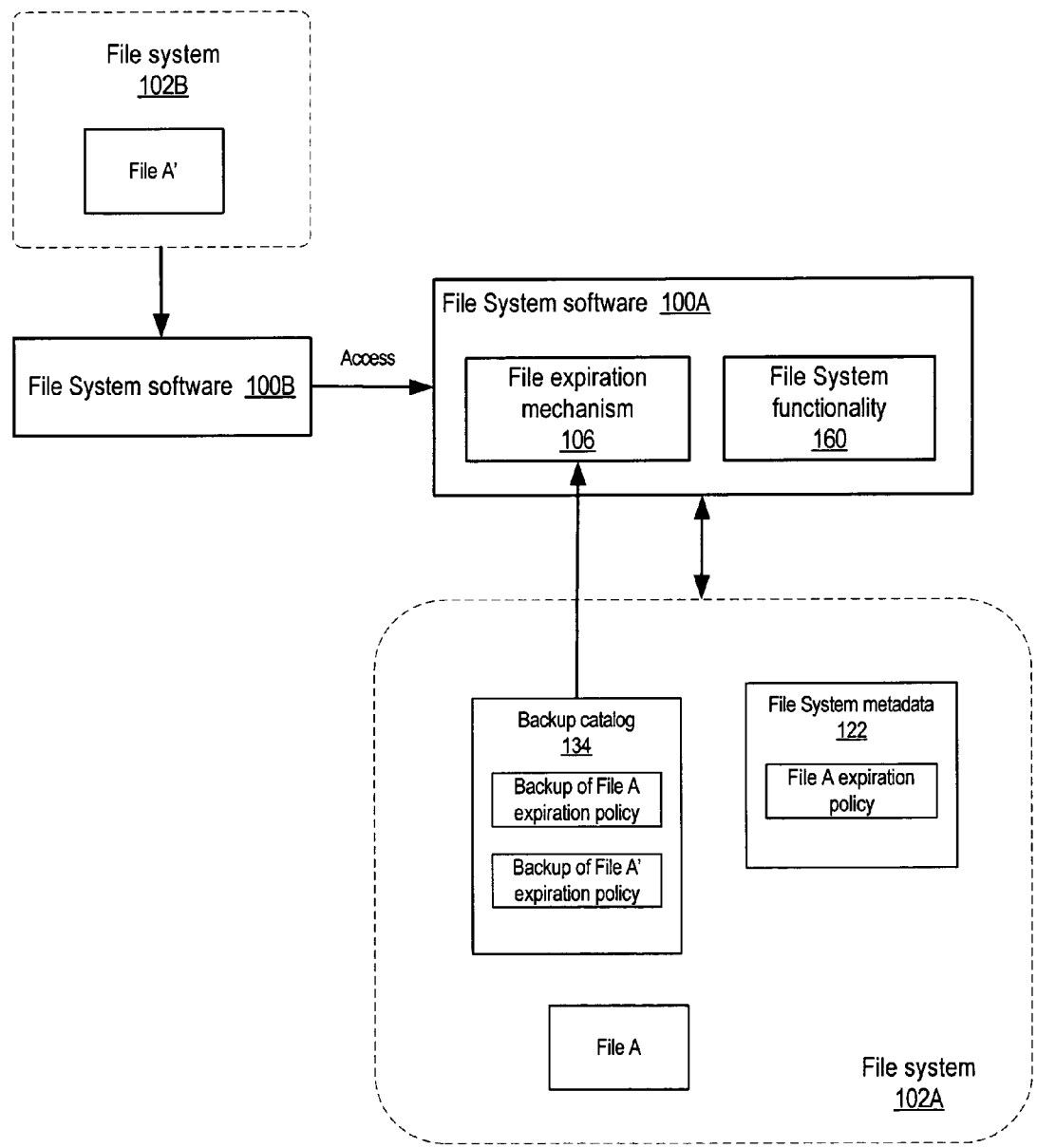

In FIG. 6F, an attempt may be made to access File A' on file system 102B. Since File A' does not have an associated expiration policy on file system 102B, file expiration mechanism 106 may access the backup of File A' expiration policy in backup catalog 134 to determine if access is to be granted to File A'. Note that, in one embodiment, backup of File A' expiration policy may have been added to backup catalog 134 by expiration policy recovery 114 mechanism as described for FIG. 6D, or in other embodiments by some other mechanism. If the expiration date for File A' has not been reached, then file expiration mechanism 106 may allow the access. If the expiration date for File A' has passed, then file expiration mechanism 106 may not allow the access to File A'.

In one embodiment of the data lifecycle management mechanism, file expiration mechanism 106 may be configured to enforce a general policy that prohibits access to any File that does not have an associated expiration policy in file system metadata 122, backup catalog 134, or in a backup image 132. In this embodiment, access to Files on file systems 102 that are managed by the data lifecycle management mechanism may be protected by expiration policies for Files with associated expiration policies, and by the general policy of file expiration mechanism 106 that may prohibit access to Files without associated expiration policies.

Note that a File without an associated expiration policy in file system metadata 122, backup catalog 134, or in a backup image 132, and thus for which access may be denied according to the general policy enforced by the file expiration mechanism 106, may subsequently be given an expiration policy, for example by expiration policy recovery 114 mechanism as described for FIG. 6D, or in other embodiments by some other mechanism.

Figure 6G:
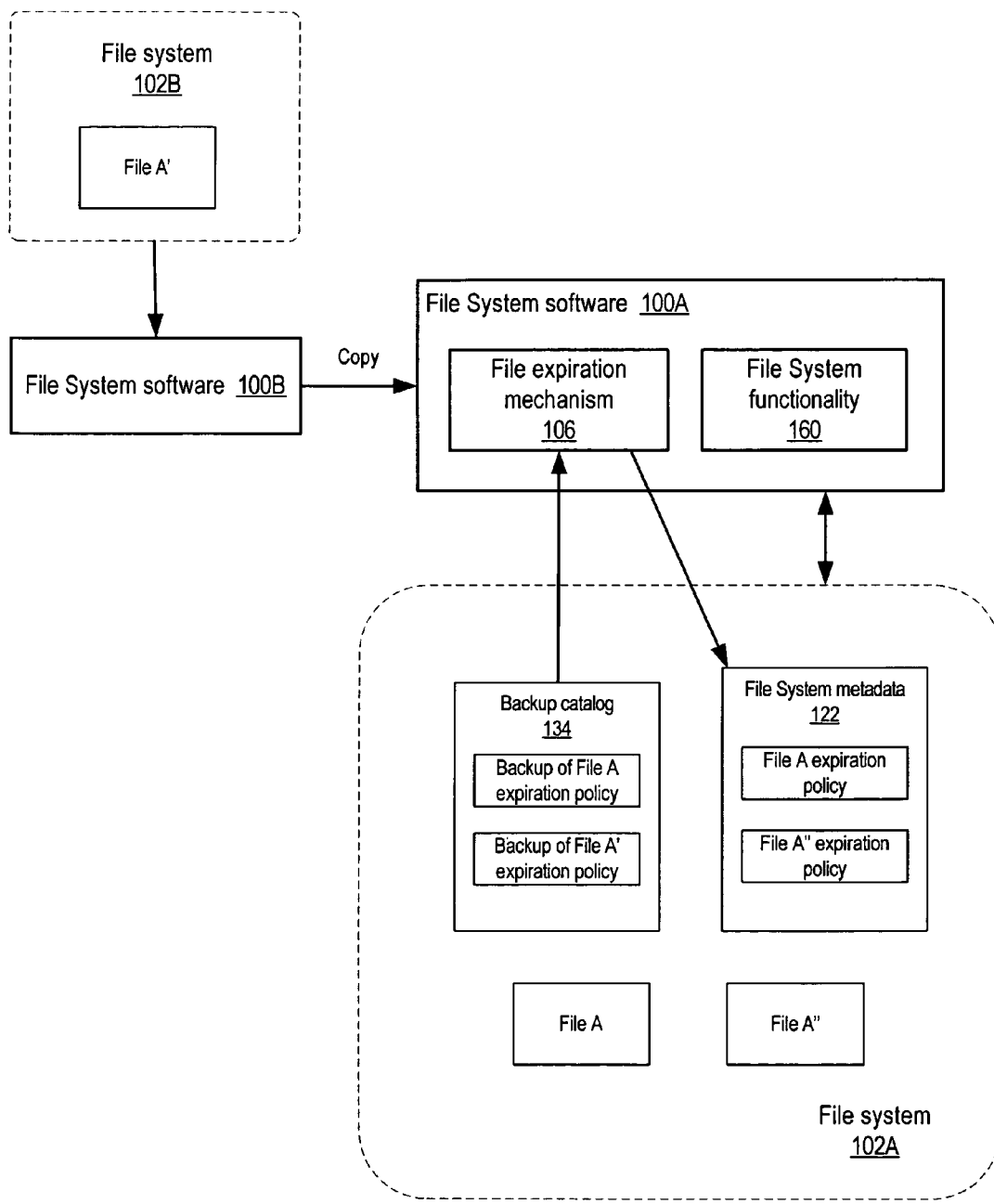

In FIG. 6G, an attempt may be made to copy or move File A' from file system 102B to file system 102A. Since File A' does not have an associated expiration policy on file system 102B, file expiration mechanism 106 may access the backup of File A' expiration policy in backup catalog 134 to determine if the copy or move of File A' to file system 102B is to be allowed. If the expiration date for File A' as specified in backup of File A' expiration policy has not been reached, then file expiration mechanism 106 may allow the copy or move of File A' to file system 102B. The copy or move operation may then be completed by the file system software, generating File A".

File expiration mechanism 106 may access the backup of File A' expiration policy in backup catalog 134 to generate File A" expiration policy in file system metadata 134. File A" expiration policy may then be enforced for File A" by the data lifecycle management mechanism. Note that File A" expiration policy may be modified if necessary or desired by an administrator. In one embodiment, a subsequent backup operation by backup system 130 may store File A" and a backup of File A" expiration policy in a backup image 132 and store a backup of File A" expiration policy in backup catalog 134, as previously described.

If the expiration date for File A' as specified in backup of File A' expiration policy has passed, in one embodiment file expiration mechanism 106 may not allow File A' to be copied or moved back to file system 102A. In one embodiment, as an alternative to not allowing File A' to be copied/moved to file system 102A, file expiration mechanism 106 may allow the copy/move operation, which generates a new file (File A"). File expiration mechanism 106 may access the backup of File A' expiration policy in backup catalog 134 to generate File A" expiration policy in file system metadata 134. File A" expiration policy may then be enforced for File A" by the data lifecycle management mechanism. Note that File A" expiration policy may be modified if necessary or desired by an administrator. In one embodiment, a subsequent backup operation by backup system 130 may store File A" and a backup of File A" expiration policy in a backup image 132 and store a backup of File A" expiration policy in backup catalog 134, as previously described.

As noted, a File may be deleted from file system 102A. Therefore, in FIGS. 6F and 6H, original File A may have been deleted from file system 102A. Note that the file system metadata 122 may no longer include File A expiration policy, but backup catalog 134 and one or more backup images 130 may still include a backup of File A expiration policy (and one or more backup images 130 may still include File A itself). Since backup catalog 134 includes information on File A' including a backup of File A' expiration policy, file expiration mechanism 106 may access the backup of File A' expiration policy from the catalog 134 to be applied to operations involving File A' on file system 102B, even though File A has been deleted. For example, if a copy of File A' is made to file system 102A, backup of File A' expiration policy in backup catalog 134 may be used to generate an expiration policy for the copy in file system metadata 122. As another example, if a copy of File A' is made on file system 102B, backup of File A' expiration policy in backup catalog 134 may be used by the data lifecycle management mechanism to generate an expiration policy for the new copy of File A' in backup catalog 134.

Figure 6H:
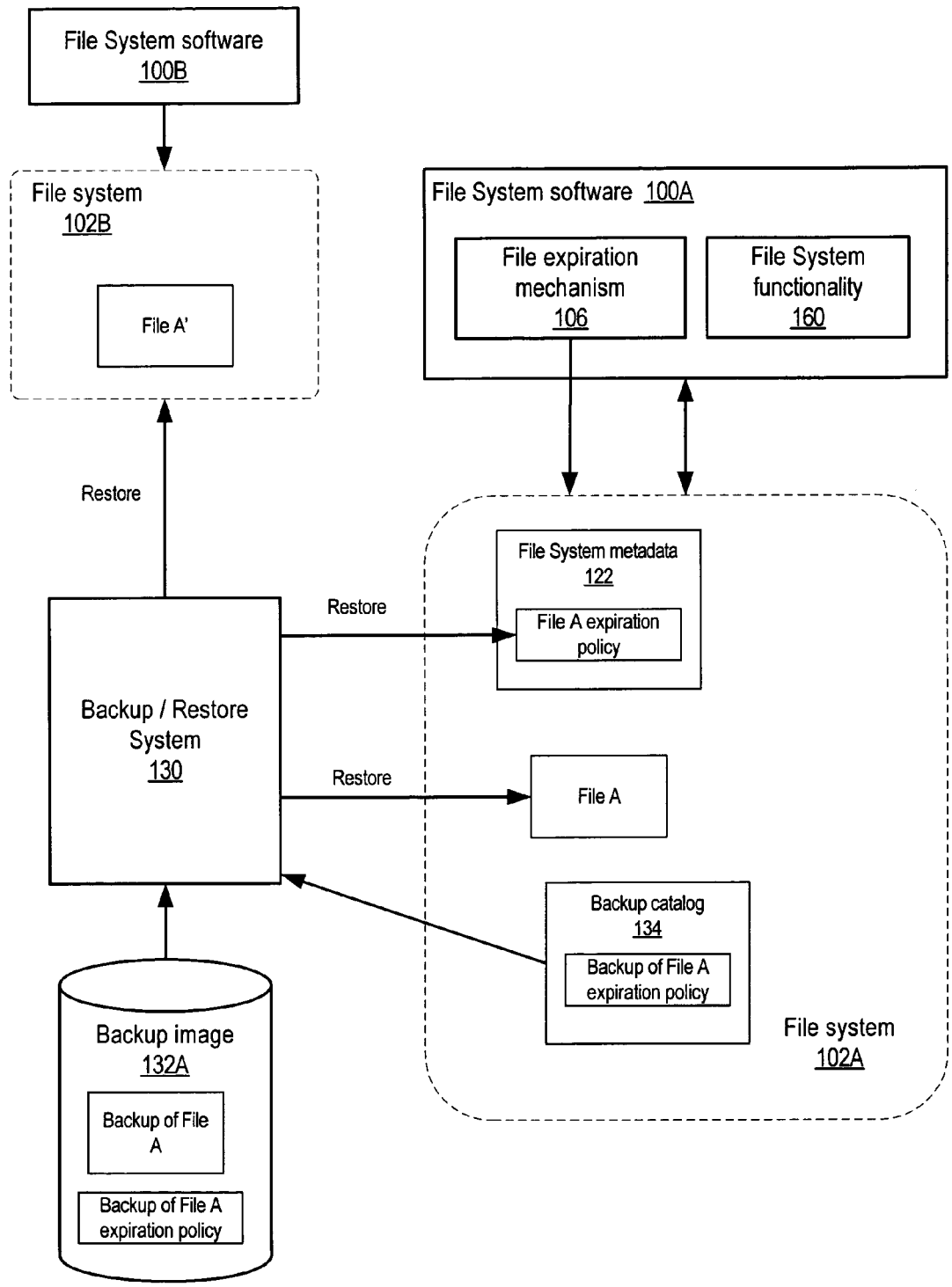

FIG. 6H illustrates a restore process for File A after deletion of File A from file system 102A. File A may be restored to file system 102A, or to another file system such as file system 102B, from a backup image 132 by backup/restore system 130. The backup of File A expiration policy stored in the backup image 132 may be restored from the backup image 132 along with the File.

In one embodiment, before restoring File A to file system 102A (or to another file system), a backup of File A expiration policy, either from backup catalog 134 or from backup image 132, may be evaluated to determine if File A has expired. If File A has not expired, then File A may be restored to file system 102A, and File A expiration policy may be restored to file system metadata 122. If File A has expired, in one embodiment, the restore may not be allowed. In another embodiment, the restore may be allowed, but subsequent accesses to the restored File A may be denied by the data lifecycle management mechanism. In one embodiment, the restore may be allowed, after which data lifecycle management mechanism may evaluate and enforce the expiration policy specified in File A expiration policy, for example by immediately deleting the file, or by taking whatever other action(s) are specified by the expiration policy.

In one embodiment, expiration policies in backup catalog 134 may be updated using a policy management mechanism such as policy management mechanism 140 illustrated in FIG. 3. Thus, the backup of File A expiration policy stored in backup image 130 may be out-of-date. In this embodiment, backup of File A expiration policy in the backup catalog 134 may be used to test the status of File A, and may be copied to file system metadata 122, instead of backup of File A expiration policy in the backup image 132.

Note that backup/restore system 130 may also be used to restore File A to other file systems, including file systems that do not support the file system metadata used to store expiration policies, and/or that do not include an implementation of a file expiration mechanism 106 in file system software 100. In this example, file system 102B does not support the file system metadata. Further, file system software 100B does not implement a file expiration mechanism 106. In one embodiment, before restoring File A to file system 102B, a backup of File A expiration policy, either from backup catalog 134 or from backup image 132, may be evaluated to determine if File A has expired. If File A has expired, the restore of File A to file system 102B is not allowed. This ensures that the expiration policy for File A is enforced, even though file system software 100B does not implement file expiration mechanism 106.

If File A has not expired, then File A may be restored to file system 102B, generating File A' on file system 102B. Since file system 102B does not support file system metadata used to store expiration policies, File A expiration policy is not restored to file system 102B. However, File A expiration policy, either from the backup image 132 or from backup catalog 134, may be duplicated to backup catalog 134 for File A' as backup of File A' expiration policy (not shown). Note that, as previously described, if backup of File A expiration policy in backup catalog 134 has been modified, it may be used to generate backup of File A' expiration policy instead of backup of File A expiration policy from backup image 132. Also note that, if file system 102B supports file system metadata used to store expiration policies, File A expiration policy may be restored to file system metadata on file system 102B as File A' expiration policy.

Note that a copy of File A from file system 102A on another file system, such as File A' on file system 102B, created by a copy/move operation or a restore operation as described above, may be renamed, copied, modified, etc. Thus, embodiments of the data lifecycle management mechanism may include a mechanism or mechanisms for identifying a File on another file system that does not have an associated expiration policy as related to (e.g., a possibly modified and/or renamed copy or descendent of) a File on file system 102A for which an expiration policy has been copied into the backup catalog 134. The expiration policy of the File on file system 102A may then be used to generate an expiration policy for the File on the other file system that does not have an expiration policy. FIG. 1 illustrates this mechanism as expiration policy recovery 114 mechanism.

Expiration policy recovery 114 mechanism may use one or more File metrics in attempting to identify a File on another file system without an associated expiration policy as related to a File and its associated expiration policy on file system 102A. These metrics may include one or more of, but are not limited to, the file name, the creation date, the size of the file, the owner and/or creator of the file, other file metadata for the file, the content of the file, etc. If expiration policy recovery 114 mechanism determines that the two Files are related (e.g., that File A' on file system 102B is a descendent of File A on file system 102A), then backup of File A expiration policy in backup catalog 134 may be used to generate backup of File A' expiration policy in backup catalog 134 for File A'.

Note that it is possible that a File on file system 102A may lose its expiration policy from file system metadata 122 for some reason. Expiration policy recovery 114 mechanism may be configured to recover the expiration policies for such a File. If available, the expiration policy for the File may be recovered from backup catalog 134, or alternatively from a backup image 132. Otherwise, expiration policy recovery 114 mechanism may attempt to identify the File as related to another File on file system 102A and, if successful, use the other File's expiration policy to generate an expiration policy for the File.

In at least some cases, it may not be possible for the expiration policy recovery 114 mechanism to be 100% sure that a File on another file system is a copy, derivative, or version (i.e., is related to) of a File on file system 102A. Therefore, in one embodiment, expiration policy recovery 114 mechanism may use one or more inference techniques to generate a measure of confidence, or confidence level, that a File being evaluated is a copy of a File on file system 102A. If this confidence level is above a certain threshold (which, in one embodiment, may be set using a policy management mechanism 140), then the File being evaluated may be assumed a copy of the File on file system 102A to which it is being compared.

In one embodiment, expiration policy recovery 114 mechanism may, at least in some cases, prompt for human input if an automated determination cannot be made for a File, and/or if it is ambiguous as to whether a File without an expiration policy is a copy of a particular File on file system 102A. An administrator or other user may then make the final determination as to whether the File is a copy of the file on file system 102A.

Note that, in one embodiment, file expiration mechanism 106 may be configured to prompt for human input to allow/disallow copy/move operations and/or file access attempts for Files without expiration policies, and/or to alert an administrator when such an attempt is made.

In one embodiment of the data lifecycle management mechanism that store a copy of the expiration policies for Files in the backup catalog 134, a mechanism may be provided to update the expiration policy stored in the backup catalog 134 for Files in the backup images. In this embodiment, if the expiration policy for a File is updated in the file system metadata 122 (e.g., by an administrator using policy management mechanism 140), the file expiration mechanism 106 may automatically, or at the direction of the administrator, update the copy or copies of the File's metadata in backup catalog 134. In other embodiments, in at least some cases only the expiration policy in the backup catalog 134 may be updated, for example if the original File has been deleted from the file system and the file system metadata 122 does not include the expiration policy for the File. Thus, if an attempt is made to restore the File from a backup image 132, the updated expiration policy for the File in the backup catalog 134 may be applied to the restore attempt for the File, rather than using the older expiration policy that was stored with the File in the backup image 132 during a backup operation.

As an example, the expiration policy for a file may originally specify that the file is to expire after one year. The file may be backed up, and the backup/restore system 130 may store a copy of the file's expiration policy in the backup catalog 134. At some later time, an IT manager may be directed to change the expiration policy for a newer version of the same file to three years. The file expiration mechanism 106 may be used to identify a most recent version of the backed-up file from the backup catalog, and the most recent version's expiration policy may be applied, if desired, when the original version of the file is restored. Consequently, the file would be available when attempts are made to open it, as it would not be if the old expiration policy were restored with the file. If, instead of extending the expiration period, the expiration period had been reduced for a file (e.g., from three years to one year), this mechanism may prevent the unintentional ability to restore, or access a restored copy of, the file that, according to modified policy, should be expired and thus unavailable.

This mechanism may help to prevent problems in a disaster recovery from a backup image 132. For example, if a file is lost from the file system 102A and is restored from a backup image 132, if the expiration policy for the file in the backup catalog 134 has not been updated, then access to the file may be either denied when it should be allowed or allowed when it should be denied.

Also note that, in cases where the expiration policy for a file is recovered from the backup catalog 134, updating the expiration policies in the backup catalog 134 may help to insure that the correct and updated version of the expiration policy for the file is used, and not an older version from a backup image 132.

Figure 7:
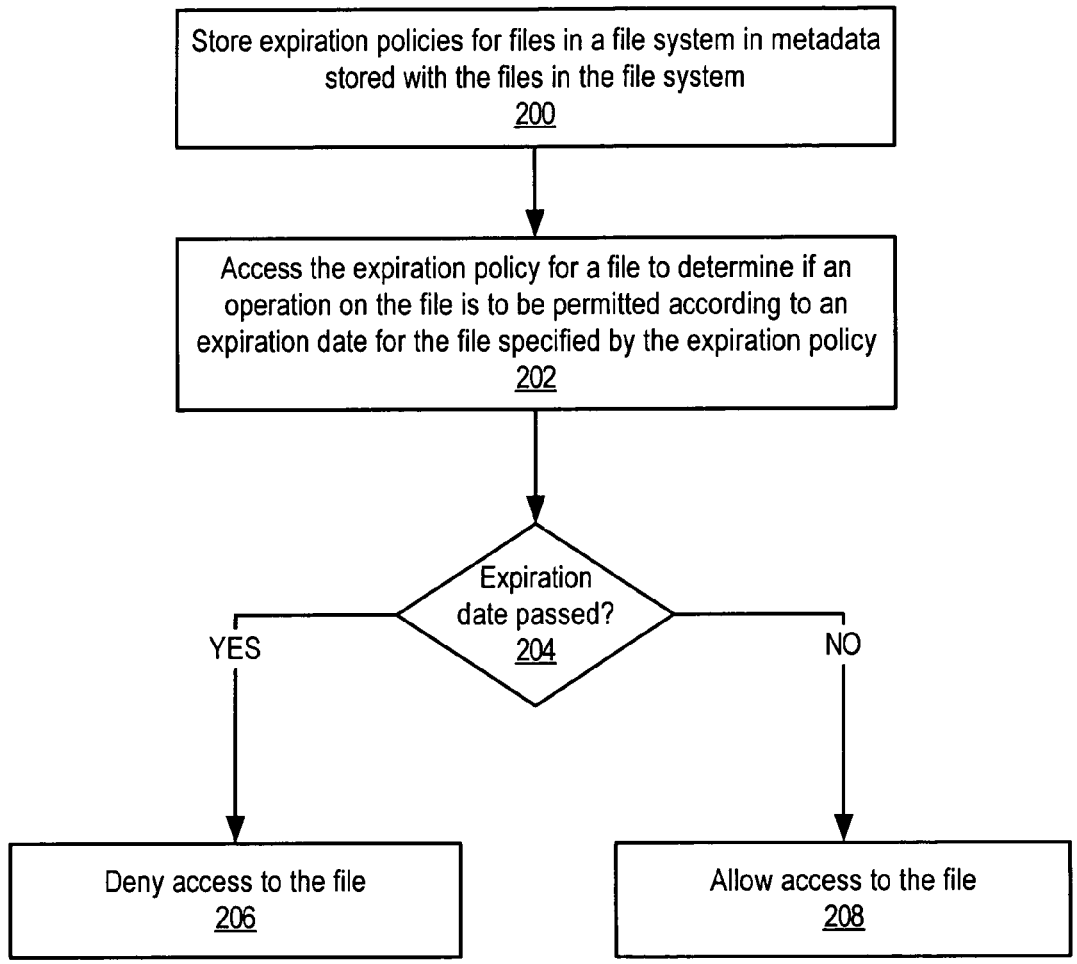
FIG. 7 is a flowchart of a method for the policy-based lifecycle management of data in file systems according to one embodiment.

FIG. 7 is a flowchart of a method for the policy-based lifecycle management of data in file systems according to one embodiment. As indicated at 200, file system software may be configured to store expiration policies for files in a file system in metadata stored with the files in the file system. In one embodiment, the metadata may be the extended attributes for the files. In other embodiments, other types of metadata may be used. In one embodiment, the expiration policies may include expiration dates for the files. In one embodiment, the expiration policies may also specify one or more actions to take if the file has passed its expiration date. In one embodiment, a policy management mechanism, such as policy management mechanism 140 illustrated in FIG. 1 and FIG. 3, may be used to specify the expiration policies for individual files, types of files, etc, in the file system in accordance with a data retention policy of the entity that owns the file system.

Note that, if a file in the file system is copied in the file system, the expiration policy of the original file is copied to the copy's associated metadata. Also note that, if a file on the file system is copied to another file system, the expiration policy is transferred with the file to the new file system if the new file system supports a mechanism to store the expiration policy and if the copy mechanism transfers metadata as well as the file. If the other file system does not support a mechanism to store the expiration policy, then policy recovery 114 mechanism may recover the expiration policy for the file, as previously described.

The file system software may be configured to access the expiration policies for files in the file system to evaluate the expiration policy when operations are attempted on the files. Operations may include any file system operation such as file open attempts, read or write accesses, file copy operations, backup or restore operations, or in general any attempt to access the files by applications, utilities, or even by file system software operations. As indicated at 202, the file system software may access the expiration policy for a file to determine if an operation on the file is to be permitted according to an expiration date for the file specified by the expiration policy. In one embodiment, a filter driver that is conceptually at the file system level may intercept calls that attempt to access files in the file system from applications, access the expiration policies for the files to evaluate the expiration policy for the files to determine if the accesses and the operations specified by the calls are to be allowed.

At 204, if the expiration date for the file for which an operation on the file is being attempted has passed (i.e., the file has expired), then the file system software may deny access to the file as indicated at 206. At 204, if the expiration date for the file for which an operation on the file is being attempted has not passed (i.e., the file has not expired), then the file system software may allow access to the file as indicated at 208.

Note that, in one embodiment, the file system software may be configured to periodically or aperiodically scan the file system, evaluate the expiration policies for all the files, and delete files from the file system for which the expiration date has passed. Alternatively, rather than deleting files for which the expiration date has passed according to the expiration policy, one or more actions specified by the expiration policies to be performed for expired files may be performed. Note that, in other embodiments, other mechanisms (e.g., a backup system, SRM system, HSM system, anti-virus software, etc.) may be configured to perform this scan process to evaluate and enforce the expiration policy for files in the file system.

Figure 8:
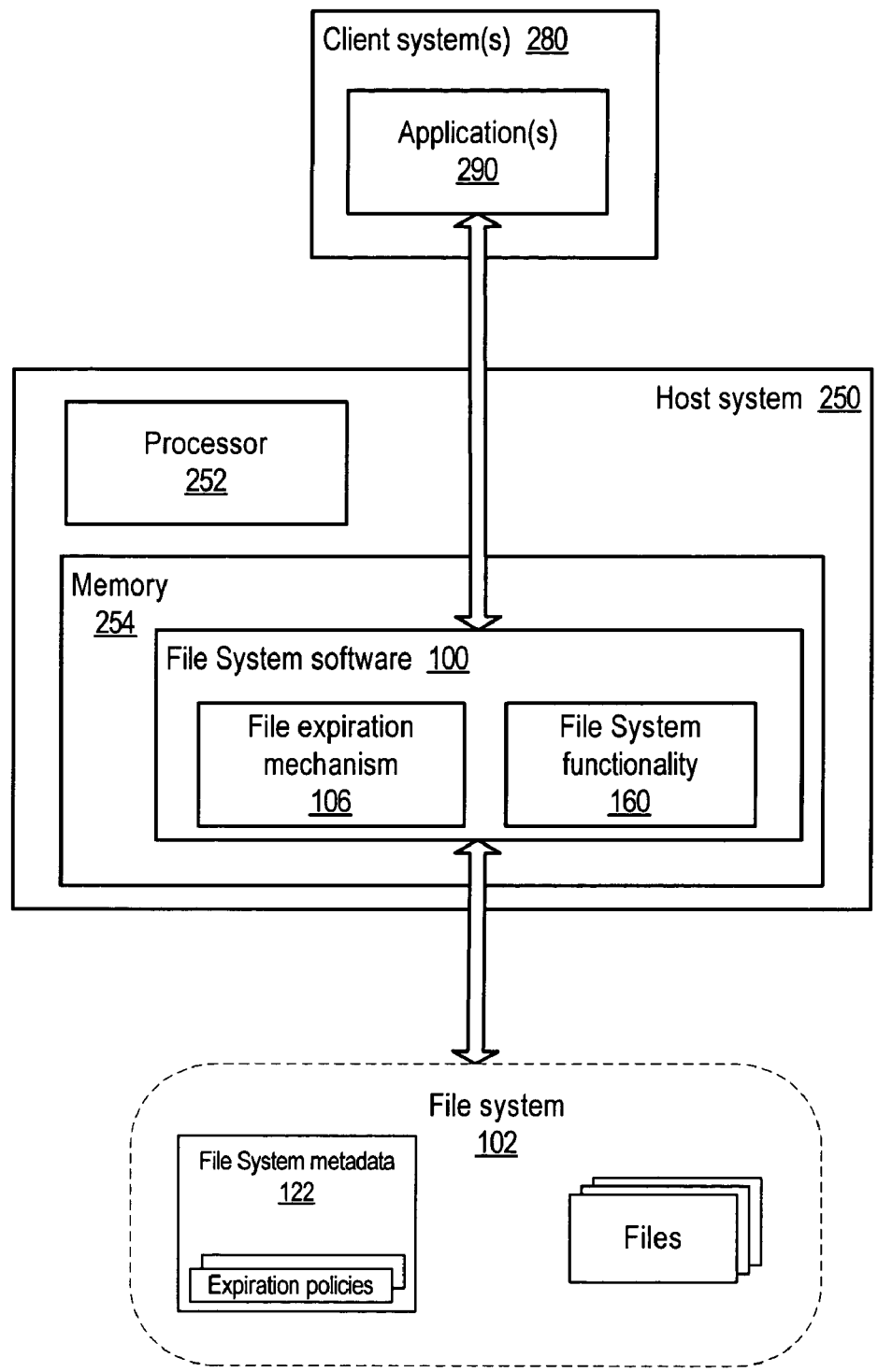
FIG. 8 illustrates an exemplary data storage system implementing an embodiment of the data lifecycle management mechanism according to one embodiment.

FIG. 8 illustrates an exemplary data storage system implementing an embodiment of the data lifecycle management mechanism according to one embodiment. Host system 250 may be any of various types of devices, including, but not limited to, a personal computer system, desktop computer, laptop or notebook computer, mainframe computer system, workstation, network computer, or other suitable device. Host system 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Host system 250 may couple, for example over a wired or wireless network or networks, to one or more other devices, e.g. client system 280, via one or more wired or wireless network interfaces. Each client system 280 may include one or more applications 290 that may be configured to create or access files in file system 102 via file system software 100. Host system 250 may couple, for example over a network, to one or more storage devices on which file system 102 is implemented. File system 102 may be implemented, for example, as a Storage Area Network (SAN), a LAN with Network-Attached Storage (NAS), or in general as any type of networked or non-networked storage system. The storage devices used to implement file system 102 may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller), CD-Rs or any other type of WORM (Write Once, Read Many) storage devices, or alternatively as a collection of devices represented as one virtual device.

Host system 250 may include, in memory 254, file system software 100. File system software 100 may include, but is not limited to, an embodiment of the file expiration mechanism 106 as described herein and software that provides "traditional" File System functionality 160. File System functionality 160 may be provided by any of various File System implementations including, but not limited to, disk-based file systems such as VERITAS' VxFS and UNIX File System (UFS), and networked file system such as Network File System (NFS) and AT&T's Remote File Share (RFS). In one embodiment, file system software 100 may also include a virtualization layer (not shown) that may be used to map file systems on the storage devices to a single file system and to present the single file system to one or more application(s).

Note that the configuration illustrated in FIG. 8 is an exemplary implementation of a data storage system implementing an embodiment of the data lifecycle management mechanism and is not intended to be limiting. Embodiments of the data lifecycle management mechanism as described herein may be implemented in other configurations of systems and storage environments.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   storing, by file system software implemented on at least one computing device, expiration policies for at least some files within a file system in file system metadata maintained by the file system software, wherein the file system software is configured to provide for creation of, management of, and access to the files within the file system, wherein each expiration policy is specific to a respective one of the at least some files and specifies one or more metrics for evaluation to determine whether the associated file is ready for expiration, wherein the file system metadata includes information that the file system software maintains on files stored in the file system, wherein a specific expiration policy associated with a file is stored in a portion of the information that the file system software maintains on the files stored in the file system that is specific to the file and that also includes location information for the file;
   wherein said storing, for said at least some files, a respective expiration policy for the respective file in a portion of the information that is specific to the respective file and that also includes location information for the file, enables each of the at least some files for moving or copying to another location while maintaining its association with its respective expiration policy; and
   evaluating, by the file system software, the expiration policies stored in the file system metadata, wherein said evaluating produces a result indicating at least one file that has passed an expiration date for the respective file according to the expiration policy corresponding to the respective file.

2. The computer-implemented method as recited in claim 1, wherein each expiration policy further specifies one or more actions for taking by the file system software if the expiration date for the associated file has passed.

3. The computer-implemented method as recited in claim 1, further comprising:
   specifying the expiration policies for the files in response to user input and in accordance with a data lifecycle management policy for the file system, wherein said specifying is performed by policy management functionality of the file system software; and
   implementing one or more security measures to protect the expiration policies from unauthorized access.

4. The computer-implemented method as recited in claim 1, further comprising periodically or aperiodically performing, by the file system software, a scan process to evaluate the expiration policies stored in the file system metadata and delete files from the file system for which the expiration date has passed.

5. The computer-implemented method as recited in claim 1, further comprising denying access, by the file system software, to files in the file system for which said result indicates the expiration date has passed.

6. The computer-implemented method as recited in claim 1, further comprising denying restore, by the file system software, of particular files to the file system from a backup or archive image for which said result indicates the expiration date has passed.

7. The computer-implemented method as recited in claim 1, further comprising:
   intercepting access calls to the files in the file system from one or more applications; and
   evaluating the expiration policy for files specified by the access calls to determine if access to the specified files is allowed or denied;
   wherein said intercepting access calls and said evaluating the expiration policy for files specified by the access calls are performed by a filter driver.

8. The computer-implemented method as recited in claim 1, wherein the file system metadata are one of inodes, directories, indirect blocks, superblocks, and extended attributes for the files.

9. The computer-implemented method as recited in claim 1, further comprising storing copies of the expiration policies in a catalog, wherein said storing copies of the expiration policies in a catalog is performed by an application or utility that periodically or aperiodically scans the files within the file system, and wherein the catalog is maintained by the application or utility.

10. The computer-implemented method as recited in claim 9, wherein the application or utility is a backup system, and wherein the copies of the expiration policies are stored in a backup catalog and in a backup image during a backup operation performed by the backup system that generates the backup image of the file system.

11. The computer-implemented method as recited in claim 9, further comprising accessing, by the file system software, a copy of the expiration policy for a file on the file system stored in the catalog or in a backup or archive image to recover the expiration policy for a copy of the file for which the expiration policy has been lost.

12. The computer-implemented method as recited in claim 9, further comprising modifying a copy of an expiration policy for a file stored in the catalog in response to a modification of the expiration policy stored in the file system metadata for the file.

13. The computer-implemented method as recited in claim 9, further comprising modifying a copy of an expiration policy stored in the catalog for a file that has been deleted from the file system.

14. The computer-implemented method as recited in claim 1, further comprising:
    copying a file from the file system to another file system;
    copying an expiration policy for the file with the copy of the file from the file system to the other file system; and
    evaluating the copy of the expiration policy on the other file system to determine if the copy of the file has passed an expiration date for the file according to the copy of the expiration policy.

15. The computer-implemented method as recited in claim 1, further comprising:
    copying a file from the file system to another file system, wherein an expiration policy of the file is not copied to the other file system;
    recovering an expiration policy for the file on the other file system, wherein said recovering comprises:
        determining that the file on the other file system is a copy of the file on the file system; and
        associating the expiration policy of the file on the file system with the copy of the file on the other file system;
    attempting to copy the copy of the file back to the file system or attempting to access the copy of the file on the other file system; and
    evaluating the expiration policy associated with the copy of the file in response to the copy attempt or the access attempt to determine if the file has passed an expiration date for the file, wherein the copy attempt or access attempt is denied if the expiration date for the file is passed and allowed if the expiration date for the file is not passed.

16. The computer-implemented method as recited in claim 1, further comprising:
    generating a copy of a file on the file system; and
    copying the expiration policy including the expiration date of the original file to the file system metadata for the copy of the file.

17. A data storage system, comprising:
    one or more storage devices comprising a file system;
    a host system comprising a memory medium storing program instructions, wherein the program instructions are executable on the host system to implement file system software configured to manage and control access to the file system; and
    one or more client systems each comprising a memory medium storing program instructions, wherein the program instructions are executable on the client system to implement one or more applications configured to access files in the file system via the file system software;
    wherein the file system software is configured to: store expiration policies for at least some files within the file system in file system metadata maintained by the file system software, wherein each expiration policy is specific to a respective one of the at least some files and specifies one or more metrics for evaluation to determine whether the associated file is ready for expiration, wherein the file system metadata includes information that the file system software maintains on files stored in the file system, wherein a specific expiration policy associated with a file is stored in a portion of the information that the file system software maintains on the files stored in the file system that is specific to the file and that also includes location information for the file;
    wherein said storing, for said at least some files, a respective expiration policy for the respective file in a portion of the information that is specific to the respective file and that also includes location information for the file, enables each of the at least some files for moving or copying to another location while maintaining its association with its respective expiration policy;
    evaluate the expiration policies stored in the file system metadata to determine files that have passed an expiration date; and
    grant or deny access to particular ones of the files in the file system by the applications according to results of said evaluation of the expiration policies, wherein access is denied for files that have passed the expiration date.

18. The data storage system as recited in claim 17, wherein the file system software is further configured to periodically or aperiodically delete files from the file system for which said evaluation of the expiration policies determines that the expiration date has passed.

19. A system, comprising:
    a processor; and
    a memory comprising program instructions, wherein the program instructions are executable by the processor to implement file system software configured to manage and control access to a file system, wherein the file system software comprises a file expiration mechanism configured to:
    store expiration policies for at least some files within the file system in file system metadata maintained by the file system software, wherein each expiration policy is specific to a respective one of the at least some files and specifies one or more metrics for evaluation to determine whether the associated file is ready for expiration, wherein the file system metadata includes information that the file system software maintains on files stored in the file system, wherein a specific expiration policy associated with a file is stored in a portion of the information that the file system software maintains on the files stored in the file system that is specific to the file and that also includes location information for the file;
    wherein said storing, for said at least some files, a respective expiration policy for the respective file in a portion of the information that is specific to the respective file and that also includes location information for the file, enables each of the at least some files for moving or copying to another location while maintaining its association with its respective expiration policy;
    evaluate the expiration policies stored in the file system metadata to determine if the files have passed an expiration date; and
    grant or deny access to particular ones of the files in the file system in accordance with results of said evaluation of the expiration policies.

20. The system as recited in claim 19, wherein the file expiration mechanism is further configured to periodically or aperiodically delete files from the file system for which said evaluation of the expiration policies determines that the expiration date has passed.

21. A computer-accessible storage medium comprising program instructions, wherein the program instructions are computer-executable to implement:

storing expiration policies for at least some files within a file system in file system metadata maintained by file system software, wherein each expiration policy is specific to a respective one of the at least some files and specifies one or more metrics for evaluation to determine whether the associated file is ready for expiration, wherein the file system metadata includes information that the file system software maintains on files stored in the file system, wherein a specific expiration policy associated with a file is stored in a portion of the information that the file system software maintains on the files stored in the file system that is specific to the file and that also includes location information for the file, and wherein the file system software is configured to manage and control access to the file system;

wherein said storing, for said at least some files, a respective expiration policy for the respective file in a portion of the information that is specific to the respective file and that also includes location information for the file, enables each of the at least some files for moving or copying to another location while maintaining its association with its respective expiration policy;

evaluating the expiration policies stored in the file system metadata to determine files that have passed an expiration date; and granting or denying access to particular ones of the files in the file system according to results of said evaluation of the expiration policies, wherein access is denied for files that have passed the expiration date.

22. The computer-accessible storage medium as recited in claim 21, wherein the program instructions are computer-executable to implement periodically or aperiodically deleting files from the file system for which said evaluating the expiration policies determines that the expiration date has passed.

23. The computer-implemented method as recited in claim 1, wherein the one or more metrics include an expiration date.

24. The data storage system as recited in claim 17, wherein the one or more metrics include an expiration date.

25. The data storage system as recited in claim 17, wherein the file system metadata are one of inodes, directories, indirect blocks, superblocks, and extended attributes of files.

26. The system as recited in claim 19, wherein the one or more metrics include an expiration date.

27. The system as recited in claim 19, wherein the file system metadata are one of inodes, directories, indirect blocks, superblocks, and extended attributes of files.

28. The computer-accessible storage medium as recited in claim 21, wherein the one or more metrics include an expiration date.

29. The computer-accessible storage medium as recited in claim 21, wherein the file system metadata are one of inodes, directories, indirect blocks, superblocks, and extended attributes of files.

* * * * *